(12) United States Patent
Park et al.

(10) Patent No.: US 10,921,652 B2
(45) Date of Patent: Feb. 16, 2021

(54) DISPLAY APPARATUS

(71) Applicant: Samsung Display Co., Ltd., Yongin-si (KR)

(72) Inventors: Doyeong Park, Hwaseong-si (KR); Byoungsun Na, Seoul (KR); Yoomi Ra, Ansan-si (KR); Kyusu Ahn, Seoul (KR); Richard James, Hwaseong-si (KR); Kookhyun Choi, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/252,941

(22) Filed: Jan. 21, 2019

(65) Prior Publication Data
US 2019/0227365 A1 Jul. 25, 2019

(30) Foreign Application Priority Data
Jan. 22, 2018 (KR) .......................... 10-2018-0007871

(51) Int. Cl.
*G02F 1/1339* (2006.01)
*G02F 1/1343* (2006.01)
(Continued)

(52) U.S. Cl.
CPC ........ *G02F 1/13394* (2013.01); *G02F 1/1337* (2013.01); *G02F 1/1368* (2013.01);
(Continued)

(58) Field of Classification Search
CPC .......... G02F 1/13394; G02F 1/133345; G02F 1/133514; G02F 1/1337; G02F 1/134309;
(Continued)

(56) References Cited

U.S. PATENT DOCUMENTS 8,643,814 B2 2/2014 Yokota et al.
9,733,509 B2 8/2017 Yu
(Continued)

FOREIGN PATENT DOCUMENTS

JP 5699741 4/2015
JP 2017-111290 6/2017
(Continued)

*Primary Examiner* — Nathanael R Briggs
(74) *Attorney, Agent, or Firm* — H.C. Park & Associates, PLC

(57) ABSTRACT

A display apparatus includes a first base substrate (BS), a second BS facing the first BS, a liquid crystal layer disposed between the first BS and the second BS, a color filter layer, pixel electrodes, a light-shielding column spacer, a common electrode, and trap electrodes. The first BS includes a display area and a non-display area. The color filter layer is disposed on the first BS in the display area. The pixel electrodes are disposed on the color filter layer. The light-shielding column spacer is disposed on the first BS in the non-display area and includes a light-shielding material. The common electrode is disposed on the second BS and faces the pixel electrodes. The liquid crystal layer is disposed between the common electrode and the pixel electrodes. The trap electrodes are disposed on a lower portion of the light-shielding column spacer and face the common electrode.

31 Claims, 17 Drawing Sheets

(51) Int. Cl.
  *G02F 1/1337* (2006.01)
  *G02F 1/1362* (2006.01)
  *G02F 1/1345* (2006.01)
  *G02F 1/1368* (2006.01)
  *G02F 1/1333* (2006.01)
  *G02F 1/1335* (2006.01)
(52) U.S. Cl.
  CPC ...... *G02F 1/13439* (2013.01); *G02F 1/13454* (2013.01); *G02F 1/133345* (2013.01); *G02F 1/133514* (2013.01); *G02F 1/134309* (2013.01); *G02F 1/136286* (2013.01); *G02F 2001/13398* (2013.01); *G02F 2001/133388* (2013.01); *G02F 2001/136218* (2013.01); *G02F 2201/121* (2013.01); *G02F 2201/122* (2013.01); *G02F 2201/123* (2013.01)
(58) Field of Classification Search
  CPC ............. G02F 1/13439; G02F 1/13454; G02F 1/136286; G02F 1/1368; G02F 1/136209; G02F 2001/133388; G02F 2001/13398; G02F 2001/136218; G02F 2201/122; G02F 2201/123
  See application file for complete search history.

(56) References Cited

U.S. PATENT DOCUMENTS

| | | |
|---|---|---|
| 9,910,312 B2 | 3/2018 | Yu et al. |
| 2014/0160413 A1* | 6/2014 | Nishida ................. G02F 1/1337 349/123 |
| 2016/0274428 A1* | 9/2016 | Kim ...................... H01L 27/124 |
| 2017/0025082 A1* | 1/2017 | Kobayashi ........... G09G 3/3677 |
| 2017/0176788 A1 | 6/2017 | Fukuoka et al. |

FOREIGN PATENT DOCUMENTS

| | | |
|---|---|---|
| KR | 10-2008-0040392 | 5/2008 |
| KR | 10-2017-0023337 | 3/2017 |

\* cited by examiner

DISPLAY APPARATUS

CROSS-REFERENCE TO RELATED APPLICATION

This application claims priority from and the benefit of Korean Patent Application No. 10-2018-0007871, filed Jan. 22, 2018, which is hereby incorporated by reference for all purposes as if fully set forth herein.

BACKGROUND

Field

One or more exemplary embodiments generally relate to a display apparatus, and more particularly, to a display apparatus capable of preventing (or at least reducing) a liquid crystal layer from being contaminated due to an ionic impurity.

Discussion

In general, a display apparatus may include a first substrate on which a plurality is of pixels are disposed, a second substrate facing the first substrate, and an image display layer disposed between the first and second substrates and driven by the plurality of pixels. As the image display layer, various image display layers, such as a liquid crystal layer, an electrowetting layer, and an electrophoretic layer, etc., may be used.

Each of the pixels may include a pixel electrode connected to a thin film transistor to receive a data voltage and a common electrode facing the pixel electrode and configured to receive a common voltage. The image display layer may be driven by an electric field formed between the pixel electrode having received the data voltage and the common electrode having received the common voltage to, thereby, display an image.

Any one of the first and second substrates may include a black matrix disposed in a non-pixel area of a display area and a non-display area to prevent light leakage. In addition, to maintain a cell gap between the first and second substrates, column spacers may be disposed between the first and second substrates. In general, the column spacers may be disposed inside an area in which the black matrix is formed to prevent reduction of an aperture ratio of the display apparatus.

The above information disclosed in this section is only for understanding the background of the inventive concepts, and, therefore, may contain information that does not form prior art.

SUMMARY

Some exemplary embodiments provide a display apparatus capable of preventing (or at least reducing) a liquid crystal layer from being contaminated due to an ionic impurity in a structure in which a light-shielding column spacer or a low reflection column spacer is provided.

Additional aspects will be set forth in the detailed description which follows, and, in part, will be apparent from the disclosure, or may be learned by practice of the inventive concepts.

According to some exemplary embodiments, a display apparatus includes a first base substrate, a second base substrate facing the first base substrate, a liquid crystal layer disposed between the first base substrate and the second base substrate, a color filter layer, pixel electrodes, a light-shielding column spacer, a common electrode, and trap electrodes. The first base substrate includes a display area and a non-display area. The color filter layer is disposed on the first base substrate in the display area. The pixel electrodes are disposed on the color filter layer. The light-shielding column spacer is disposed on the first base substrate in the non-display area and includes a light-shielding material. The common electrode is disposed on the second base substrate and faces the pixel electrodes. The liquid crystal layer is disposed between the common electrode and the pixel electrodes. The trap electrodes are disposed on a lower portion of the light-shielding column spacer and face the common electrode.

In some exemplary embodiments, the common electrode may be configured to receive a common voltage, and the trap electrodes may be configured to receive a trap voltage having a loweer potential than the common voltage.

In some exemplary embodiments, the display apparatus may further include a sealing member disposed between the first base substrate and the second base substrate, the sealing member bonding the first base substrate and the second base substrate and sealing the liquid crystal layer. The sealing member may be disposed on the light-shielding column spacer in the non-display area.

In some exemplary embodiments, the display apparatus may further include: a first alignment layer disposed on the light-shielding column spacer in the non-display area and spaced apart from the sealing member so as not to overlap the sealing member in a plan view, and a second alignment layer disposed on the common electrode in the non-display area and spaced apart from the sealing member so as not to overlap the sealing member in the plan view.

In some exemplary embodiments, the display area may have a quadrilateral shape defined in a first direction and a second direction perpendicular to the first direction, and the trap electrodes may be disposed adjacent to four corners of the display area.

In some exemplary embodiments, the display apparatus may further include: gate lines disposed on the first base substrate in the display area and extending in the first direction;

data lines disposed on the first base substrate in the display area and extending in the second direction; and a gate driver disposed on the non-display area, the gate driver being configured to provide a gate signal to the display area.

In some exemplary embodiments, the gate driver may include at least one among first and second gate drivers respectively connected to opposing ends of the gate lines. Each of the first and second gate drivers may include: a shift register configured to generate the gate signal, and a first off voltage line configured to provide a first off voltage to the shift register.

In some exemplary embodiments, the trap electrodes may be electrically connected to the first off voltage line and may be configured to receive the first off voltage.

In some exemplary embodiments, the display apparatus may further include a shielding electrode disposed on the first base substrate in the display area and extending along at least one of the gate lines and the data lines, the shielding electrode being configured to receive a shielding voltage having an equivalent potential to the common voltage.

In some exemplary embodiments, each of the trap electrodes may include: first sub-trap electrodes electrically connected to the first off voltage line and configured to receive the first off voltage, and second sub-trap electrodes connected to the shielding electrode and configured to receive the shielding voltage.

In some exemplary embodiments, the first and second sub-trap electrodes may be alternately disposed in the first direction and the second direction.

In some exemplary embodiments, each of the trap electrodes may include: first sub-trap electrodes electrically connected to the first off voltage line and configured to receive the first off voltage, and second sub-trap electrodes in an electrically floating state.

In some exemplary embodiments, the first and second sub-trap electrodes may be alternately disposed in the first direction and the second direction.

In some exemplary embodiments, each of the first and second gate drivers may include a third off voltage line configured to provide a second off voltage to the shift register.

In some exemplary embodiments, the trap electrodes may be electrically connected to the third off voltage line and may be configured to receive the second off voltage.

In some exemplary embodiments, each of the trap electrodes may include: first sub-trap electrodes electrically connected to the first off voltage line and configured to receive the first off voltage, and second sub-trap electrodes electrically connected to the third off voltage line and configured to receive the second off voltage.

In some exemplary embodiments, the display area may include pixel areas and a non-pixel area outside the pixel areas. The color filter layer may include: red, green, and blue color filters disposed on the pixel areas and respective portions of the non-pixel area; and a dummy color filter disposed on the red, green, and blue color filters in the non-pixel area.

In some exemplary embodiments, the dummy color filter may be disposed in an area in which a transistor is formed in the non-pixel area, and the light-shielding column spacer may include a protrusion part supporting the second base substrate in the area in which the dummy color filter is formed.

In some exemplary embodiments, the display apparatus may further include an organic insulation layer covering the color filter layer. The pixel electrodes and the trap electrodes may be disposed on the organic insulation layer.

In some exemplary embodiments, in a plan view, each of the trap electrodes may have a quadrilateral shape.

In some exemplary embodiments, in a plan view, each of the trap electrodes may have an "L" shape.

According to some exemplary embodiments, a display apparatus includes a first base substrate, a second base substrate, a liquid crystal layer, a color filter layer, pixel electrodes, a low reflection column spacer, a common electrode, and trap electrodes. The first base substrate includes a display area and a non-display area. The second base substrate faces the first base substrate. The liquid crystal layer is disposed between the first base substrate and the second base substrate. The color filter layer is disposed on the first base substrate in the display area and the non-display area. The pixel electrodes are disposed on the color filter layer in the display area. The low reflection column spacer is disposed on the first base substrate in the non-display area, the low reflection column spacer including a low reflection material. The common electrode is disposed on the second base substrate and faces the pixel electrodes. The liquid crystal layer is disposed between the common electrode and the pixel electrodes. The trap electrodes are disposed on the color filter layer in the non-display area and face the common electrode.

In some exemplary embodiments, the display area may include pixel areas and a non-pixel area outside the pixel areas. The color filter layer may include: red, green, and blue color filters disposed on the pixel areas and respective portions of the non-pixel area; and a first dummy color filter disposed on the red, green, and blue color filters in the non-pixel area.

In some exemplary embodiments, the low reflection column spacer may be disposed on the first dummy color filter in the non-pixel area and may support the second base substrate.

In some exemplary embodiments, the color filter layer may include: a second dummy color filter disposed on the first base substrate in the non-display area, and a third dummy color filter disposed on the second dummy color filter in the non-display area.

In some exemplary embodiments, the trap electrodes may be disposed on the third dummy color filter such that the third dummy color filter is stacked between the trap electrodes and the first base substrate.

In some exemplary embodiments, the display apparatus may further include an organic insulation layer covering the color filter layer. The pixel electrodes and the trap electrodes may be disposed on the organic insulation layer.

In some exemplary embodiments, the trap electrodes may include an opening part exposing the organic insulation layer.

In some exemplary embodiments, the common electrode may be configured to receive a common voltage, and the trap electrodes may be configured to receive a trap voltage having a lower potential than the common voltage.

In some exemplary embodiments, the display apparatus may further include a sealing member disposed between the first base substrate and the second base substrate, the is sealing member bonding the first base substrate and the second base substrate and sealing the liquid crystal layer. The sealing member may be disposed on the low reflection column spacer in the non-display area.

In some exemplary embodiments, the display apparatus may further include: a first alignment layer disposed on the low reflection column spacer in the non-display area and spaced apart from the sealing member so as not to overlap the sealing member in a plan view, and a second alignment layer disposed on the common electrode in the non-display area and spaced apart from the sealing member so as not to overlap the sealing member in the plan view.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
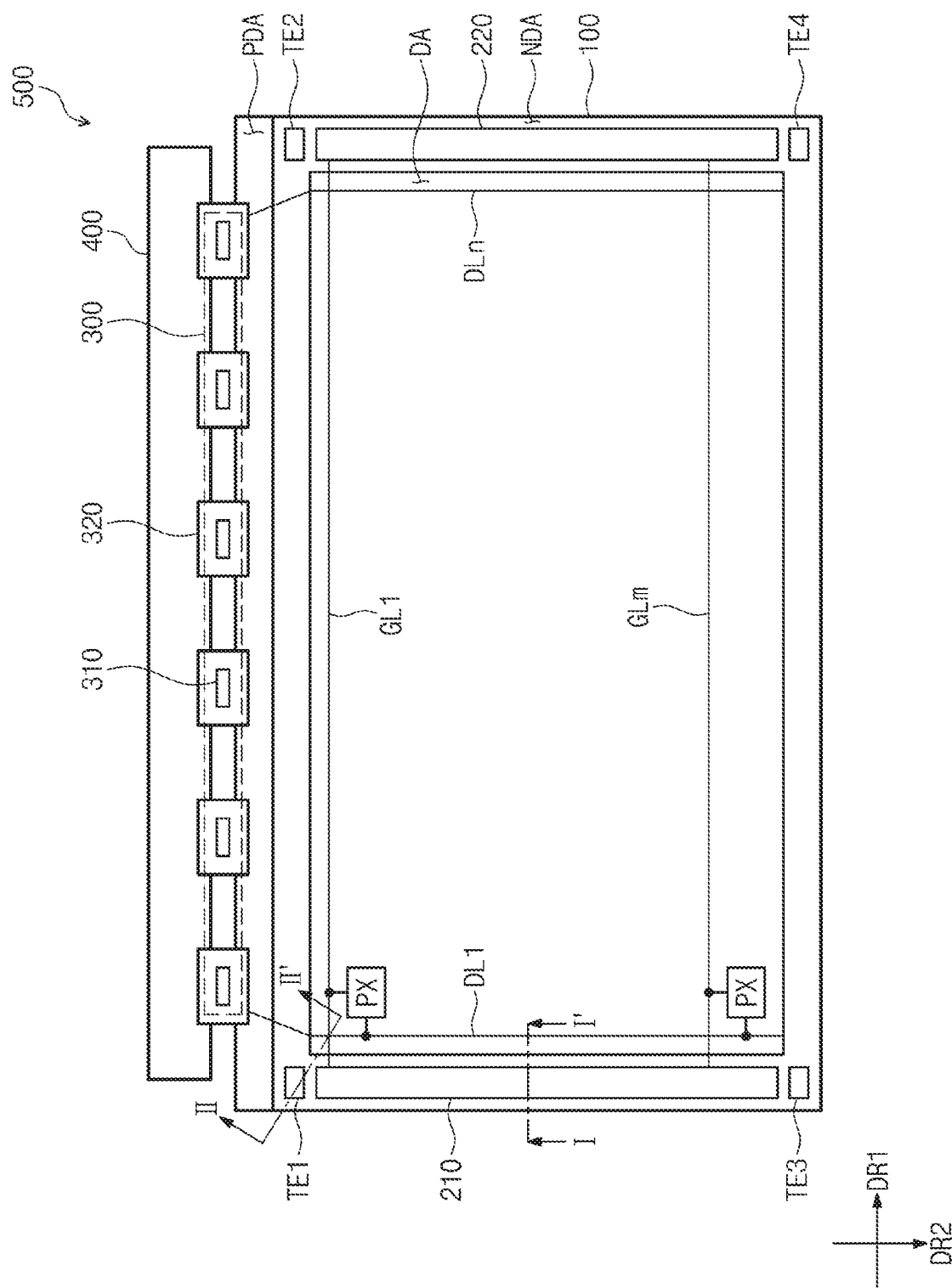
FIG. 1 illustrates a plan view of a display apparatus according to some exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. In this manner, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the inventive concepts. Further, the blocks, units, and/or modules of some exemplary embodiments may be physically combined into more complex blocks, units, and/or modules without departing from the inventive concepts.

Hereinafter, it will be described in detail about an exemplary embodiment of the inventive concept with reference to the accompanying drawings.

Figure 2:
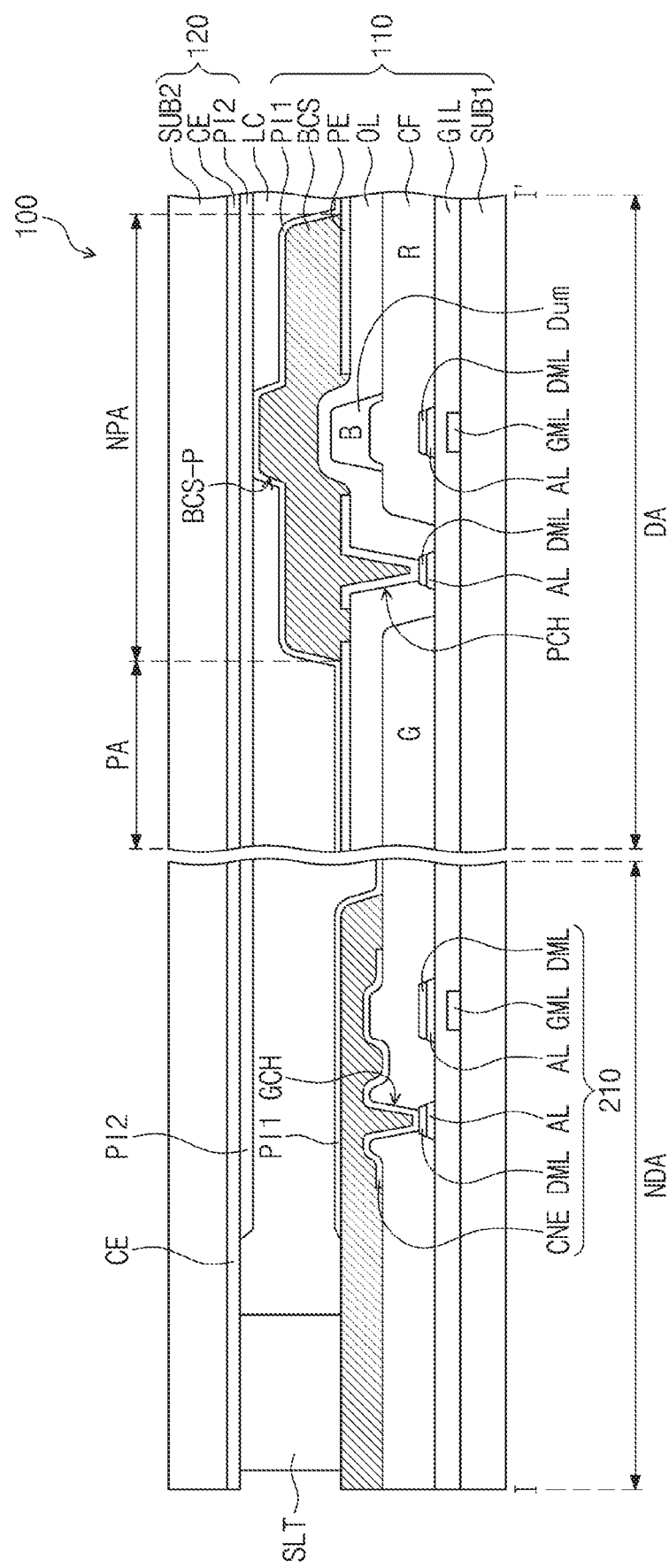
FIG. 2 is a cross-sectional view of the display apparatus of FIG. 1 taken along sectional line I-I' according to some exemplary embodiments.

FIG. 1 illustrates a plan view of a display apparatus according to some exemplary embodiments. FIG. 2 is a cross-sectional view of the display apparatus of FIG. 1 taken along sectional line I-I' according to some exemplary embodiments.

Referring to FIGS. 1 and 2, the display apparatus 500 according to some exemplary embodiments includes a display panel 100, gate drivers 210 and 220, a data driver 300, and driving circuit substrate 400. The display panel 100 may be a liquid crystal display panel that includes a first substrate 110, a second substrate 120 facing the first substrate 110, and liquid crystal layer LC disposed between the first substrate 110 and the second substrate 120.

The display panel 100 may have a rectangular shape having long sides extended in a first direction DR1 and short sides extended in a second direction DR2 crossing the first direction DR1. The display panel 100 may be a curved display panel curved with respect to the first direction DR1; however, the inventive concepts are not limited thereto. For instance, the display panel 100 may be a flat display panel.

The display panel 100 includes a plurality of gate lines GL1 to GLm, a plurality of data lines DL1 to DLn, and a plurality of pixels PX, where "m" and "n" are integers greater than 0. It is noted, however, that "m" and "n" may or may not be equal to one another. The gate lines GL1 to GLm and the data lines DL1 to DLn are insulated from each other and disposed to intersect (or cross) with each other. The gate lines GL1 to GLm are extended in the first direction DR1 to be connected to the gate drivers 210 and 220. The data lines DL1 to DLn are extended in the second direction DR2 to be connected to the data driver 300.

A planar area of the display panel 100 includes a display area DA on (or in) which an image is displayed, and a non-display area NDA disposed outside the display area DA, e.g., the non-display area NDA may surround the display area DA. The non-display area NDA is an area without the image displayed thereon (or therein). Pixels PX may be arrayed in a matrix form on the display area DA that may include a plurality of rows parallel to the first direction DR1 and a plurality of columns parallel to the second direction DR2. It is noted, however, that any other suitable arrangement of pixels PX may be utilized in association with at least one exemplary embodiment. The pixels PX are disposed at regions divided by the gate lines GL1 to GLm and the data lines DL1 to DLn that intersect with each other. The pixels PX may be arrayed in a matrix of "m" rows and "n" columns.

Each of the pixels PX is connected to at least one corresponding gate line among the plurality of gate lines GL1 to GLm and at least one corresponding data line among the plurality of data lines DL1 to DLn. Each of the pixels PX may display one of primary colors. The primary colors may include, for example, red, green, blue, and white. However, the primary colors are not limited thereto, and may include any suitable color. For instance, the primary colors may additionally or alternatively include colors, such as yellow, cyan, and magenta.

The gate drivers 210 and 220 may include a first gate driver 210 and a second gate driver 220. The first and second gate drivers 210 and 220 may be disposed on the non-display area NDA of the display panel 100. For example, the first gate driver 210 is disposed on the non-display area NDA between the display area DA and a short side adjacent to one end of the gate lines GL1 to GLm among the short sides of the display panel 100. The second gate driver 220 is disposed on the non-display area NDA between the display area DA and a short side adjacent to the other end of the gate lines GL1 to GLm among the short sides of the display panel 100. In other words, the display area DA may be disposed between the first and second gate drivers 210 and 220.

The gate drivers 210 and 220 may be simultaneously formed through the same process as that of transistors of the pixels PX and mounted on the display panel 100 in an amorphous silicon thin film transistor (TFT) gate driver circuit (ASG) type or an oxide silicon TFT gate driver circuit (OSG) type. However, the inventive concepts are not limited thereto, and the gate drivers 210 and 220 may be mounted on a flexible printed circuit board in a plurality of driving chip forms, and then connected to the display panel 100 in, for instance, a tape carrier package (TCP) form. As another example, the first and second gate drivers 210 and 220 may be disposed in a chip-on-glass (COG) form or chip-on-plastic (COP) form in which a plurality of driving chips is mounted on the display panel 100.

The first and second gate drivers 210 and 220 receive a gate control signal from a timing controller (not shown) mounted on the driving circuit substrate 400. Although not shown, is the timing controller may be mounted on the driving circuit substrate 400 in an integrated circuit (IC) chip form to be connected to the data driver 300 and the first and second gate drivers 210 and 220.

Each of the first and second gate drivers 210 and 220 may generate a plurality of gate signals in response to the gate control signal. The gate signals may be sequentially output; however, exemplary embodiments are not limited thereto. The gate signals may be provided to the pixels PX row-by-row through the gate lines GL1 to GLm. As a result, the pixels PX may be driven row-by-row.

Although FIG. 1 illustrates a structure in which the gate driver is provided as the first and second gate drivers 210 and 220, the inventive concepts are not limited thereto. For instance, the gate driver may include only one gate driver connected to one end of the plurality of gate lines GL1 to GLm, or any other suitable structure. In addition, although FIG. 1 illustrates the structure in which the first and second gate drivers 210 and 220 simultaneously output gate signals to an identical gate line, the first and second gate drivers 210 and 220 may be connected to different gate lines and alternately output the gate signals.

The data driver 300 includes a plurality of data driving chips 310. The plurality of data driving chips 310 may be respectively mounted on the flexible circuit substrates 320 and electrically connected to the driving circuit substrate 400 and the display panel 100. The planar area of the display panel 100 may further include a pad area PDA, which is disposed between one long side of the display panel 100 and the non-display area NDA and to which the flexible circuit substrates 320 are attached. The data driver 300 may be connected to the display panel 100 in the TCP form. However, the inventive concepts are not limited thereto. For instance, the data driver 300 may be disposed in a COG form in which a plurality of driving chips is mounted is on the display panel 100.

The data driver 300 receives image signals and a data control signal from the timing controller. The data driver 300 generates analog data voltages corresponding to the image signals in response to the data control signal. The data voltages are provided to the plurality of pixels PX through the data lines DL1 to DLn.

The pixels PX receive the data voltages provided through the plurality of data lines DL1 to DLn in response to the gate signals provided through the plurality of gate lines GL1 to GLm. The pixels PX may display the image by displaying gray scales corresponding to the data voltages.

As seen in FIG. 2, the first substrate 110 includes a first base substrate SUB1, a gate metal layer GML, a gate insulation layer GIL, an active layer AL, a data metal layer DML, a color filter layer CF, an organic insulation layer OL, a pixel electrode PE, a light-shielding column spacer BCS, and a first alignment layer PI1 The second substrate 120 includes a second base substrate SUB2, a common electrode CE, and a second alignment layer PI2. The liquid crystal layer LC is disposed between the first base substrate SUB1 and second base substrate SUB2.

Each of the first and second base substrates SUB1 and SUB2 may be a transparent or opaque insulation substrate, and may be formed from, for instance, silicon, glass, plastic, etc. A display area DA of the first base substrate SUB1 may include a plurality of pixel areas PA and non-pixel areas NPA disposed around the pixel areas PA.

A gate metal layer GML is disposed on the first base substrate SUB1 of the non-pixel area NPA. The gate metal layer GML may include the plurality of gate lines GL1 to GLm (see FIG. 1) and a plurality of gate electrodes extended from the plurality of gate lines GL1 to GLm. Each gate electrode may be a control electrode of a respective transistor included in a pixel PX. The gate insulation layer GIL is disposed on the first base substrate SUB 1 so as to cover the gate metal layer GML. The gate insulation layer GIL may be an inorganic insulation layer including an inorganic material.

The active layer AL is disposed on the gate insulation layer GIL covering the gate metal layer GML. The active layer AL may be a semiconductor layer forming a conductive channel between input and output electrodes of the transistor. Although not shown in the drawings, the first substrate 110 may further include an ohmic contact layer formed on the active layer AL. The active layer AL may be selected from among, for instance, amorphous silicon, polysilicon, and metal oxide semiconductor.

The data metal layer DML may be disposed on the active layer AL. The data metal layer DML includes a plurality of data lines DL1 to DLn (see FIG. 1) and data electrodes. Each of the data electrodes may include the input and output electrodes of the transistor. When the active layer AL and data metal layer DML are simultaneously patterned for mask reduction, the active layer AL may be disposed on a lower portion of the data metal layer DML. However, when the active layer AL and the data metal layer DML are respectively patterned through different processes, the active layer AL is disposed at a position at which the transistor is formed, and the active layer AL may not be disposed on lower portions of the data lines DL1 to DLn.

The color filter layer CF may be disposed to cover the data metal layer DML. The color filter layer CF includes a red color filter R, a green color filter G, and a blue color filter B that are disposed in the pixel area PA of the display area DA. The color filter layer CF may be disposed in the non-pixel area NPA of the display area DA. The color filter layer CF in the non-pixel area NPA may further include a dummy color filter Dum. For example, in a red pixel in is which the red color filter R is disposed in the pixel area PA, the blue color filter B may be disposed as a dummy color filter Dum in the non-pixel area NPA of the red pixel. As another example, in a green pixel in which the green color filter G is disposed in the pixel area PA, a red color filter R may be disposed as a dummy color filter Dum in the non-pixel area NPA. The dummy color filter Dum of each pixel PX may be formed of one of color filters having different colors from the color filter disposed in the corresponding pixel area PA. In some exemplary embodiments, the color filter layer CF may not be formed in the non-display area NDA.

The organic insulation layer OL may be disposed on the color filter layer CF in the display area DA. Although a structure in which the color filter layer CF is covered with the organic insulation layer OL is shown as an example, the color filter layer CF may be covered by a passivation layer formed of an inorganic material. The display panel 100 may selectively include the passivation layer and the organic insulation layer OL or include both of them as another example. When the display panel 100 includes both the passivation layer and the organic insulation layer OL, the organic insulation layer OL may be disposed on the passivation layer. On the other hand, the data metal layer DML in the non-display area NDA without the color filter layer CF may be covered with the organic insulation layer OL. In the non-display area NDA, the passivation layer may also be additionally provided on the data metal layer DML, or provided so as to replace the organic insulation layer OL.

The organic insulation layer OL may include a contact part for exposing the data metal layer DML. The contact part may include a pixel contact hole PCH for exposing an output electrode of a transistor in the pixel PX and a gate contact hole GCH for exposing electrodes for an electrical contact of each element in the first and second gate drivers 210 and 220. For instance, in an area in which the pixel contact hole PCH is formed, a contact hole that has a is larger size than the pixel contact hole PCH, may be formed in the color filter layer CF to expose a portion of the data metal layer DML and the gate insulation layer GIL. The pixel contact hole PCH may be disposed in the non-pixel area NPA.

Pixel electrodes PE are disposed on the organic insulation layer OL. The pixel electrodes PE are disposed in the pixel area PA of the pixels PX and partially extended to the non-pixel area NPA to electrically connect to the output electrode of the transistor of the corresponding pixel PX through the pixel contact hole PCH.

A connection electrode CNE is disposed on the organic insulation layer OL in the non-display area NDA. The connection electrode CNE contacts the exposed electrodes through the gate contact hole GCH so as to electrically connect elements of the gate drivers 210 and 220 to each other.

In correspondence with the non-display area NDA and the non-pixel area NPA, a light-shielding column spacer BCS is formed on a portion of the organic insulation layer OL, the pixel electrode PE, and the connection electrode CNE. The light-shielding column spacer BCS may be formed of an organic material including a light blocking material (e.g., carbon or the like) that may block light. The light-shielding column spacer BCS may have a black color.

When viewed from the top portion (e.g., in a plan view), the light-shielding column spacer BCS may cover the pixel electrode PE and a portion of the organic insulation layer OL in the non-pixel area NPA. The light-shielding column spacer BCS may maintain a cell gap between the first substrate 110 and the second substrate 120. For instance, in an area in which the dummy color filter Dum is formed, a top surface of the organic insulation layer OL may be disposed higher (e.g., further from the first substrate SUB1) than in other areas of the organic insulation layer OL. Accordingly, in the area in which the dummy color filter Dum is formed, the light-shielding column spacer BCS disposed on the organic insulation layer OL is also disposed higher than in other areas.

For example, the dummy color filter Dum may be disposed on the transistor in the non-pixel area NPA. The portion of the non-pixel area NPA with the transistor disposed therein is formed to be higher than other portions of the non-pixel area NPA without the transistor disposed therein. Accordingly, a step-difference due to the transistor and a step-difference due to the dummy color filter Dum all contribute to provide a protrusion part BCS-P for maintaining the cell gap in the light-shielding column spacer BCS. In other words, the dummy color filter Dum and the transistor overlap the light-shielding column spacer BCS, and thus, the light-shielding column spacer BCS may be provided with the protrusion part BCS-P that may support the second substrate 120.

When viewed from the top portion, the light-shielding column spacer BCS is disposed to cover the connection electrode CNE and a portion of the organic insulation layer OL in the non-display area NDA.

The first alignment layer PI1 is disposed to cover the light-shielding column spacer BCS, a portion of the organic insulation layer OL, the pixel electrode PE, and the connection electrode CNE. The first alignment layer PI1 is disposed on the top surface of the light-shielding column spacer BCS in the non-pixel area NPA. For instance, a portion of the first alignment layer PI1 that is disposed on the top surface of the protrusion part BCS-P may contact the second alignment layer P12 of the second substrate 120.

The transistor of each pixel PX is turned on by a gate signal received through a corresponding gate line among the gate lines GL1 to GLm. The turned-on transistor provides a data voltage received through a corresponding data line among the data lines DL1 to DLn to the pixel electrode PE. A common voltage is applied to the common electrode CE. A horizontal electric field is formed between the pixel electrode PE and the common electrode CE by a voltage difference between the data voltage and the common voltage, and the liquid crystal layer LC is driven by the horizontal electric field. Light transmittance is adjusted by liquid crystal molecules driven by the horizontal electric field in the liquid crystal layer LC, and thus, an image may be displayed.

The display panel 100 according to some exemplary embodiments may further include a sealing member SLT configured to bond the first and second substrates 110 and 120, and seal a space between the first and second substrates 110 and 120. The sealing member SLT may be provided on the light-shielding column spacer BCS in the non-display area NDA.

To strengthen contact force between the sealing member SLT and the first substrate 110, the first alignment layer PI1 is formed not to overlap the sealing member SLT in a planar view. In other words, the first alignment layer PI1 is disposed to be spaced apart from the sealing member SLT by a determined distance. Accordingly, the top surface of the light-shielding column spacer BCS may be exposed between the sealing member SLT and the first alignment layer PI1. Similarly, to strengthen contact force between the sealing member SLT and the second substrate 120, the second alignment layer PI2 is formed not to overlap the sealing member SLT in a planar view.

Figure 3:
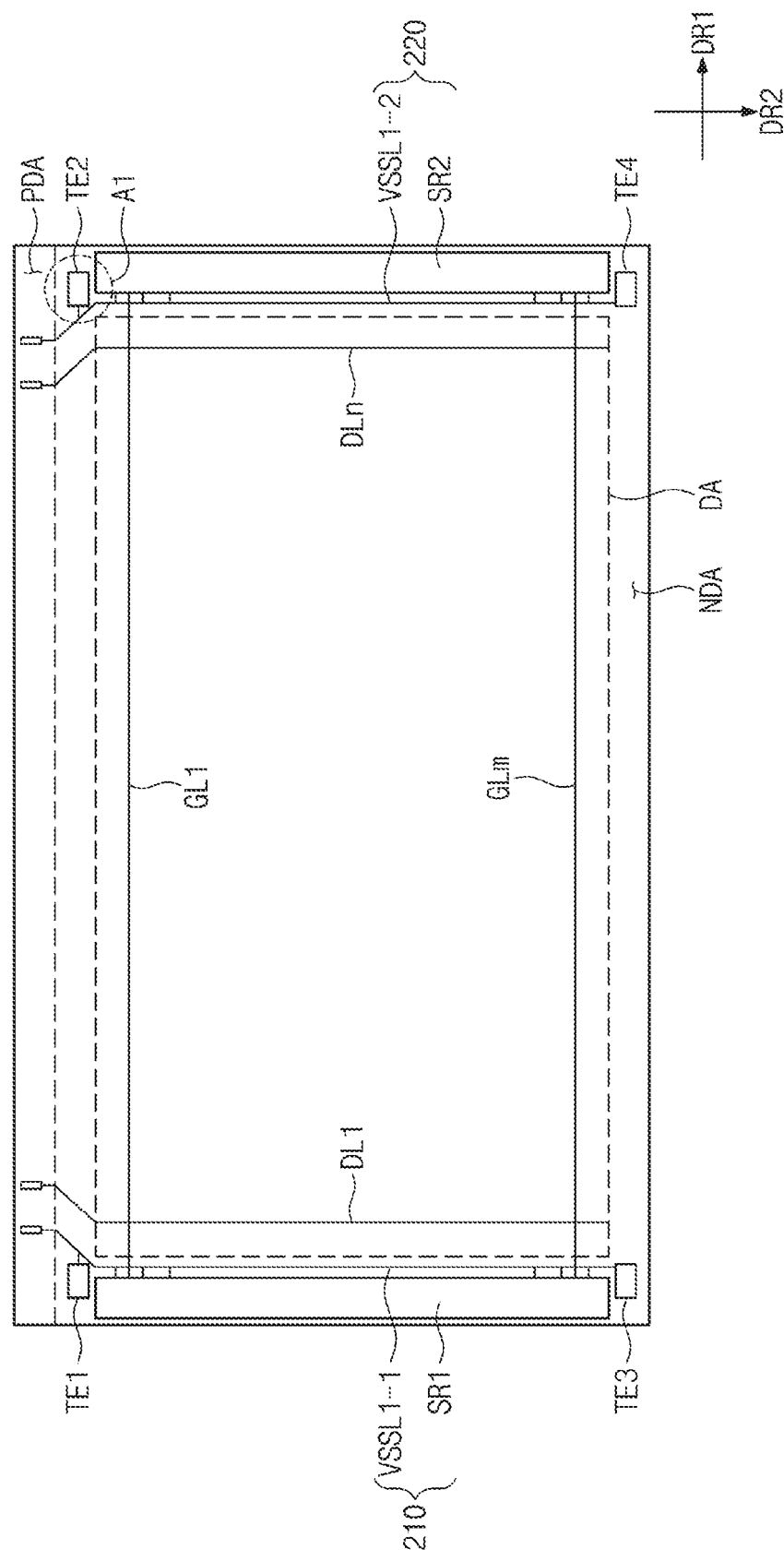
FIG. 3 is a plan view of a first substrate of the display apparatus of FIG. 1 according to some exemplary embodiments.
Figure 4:
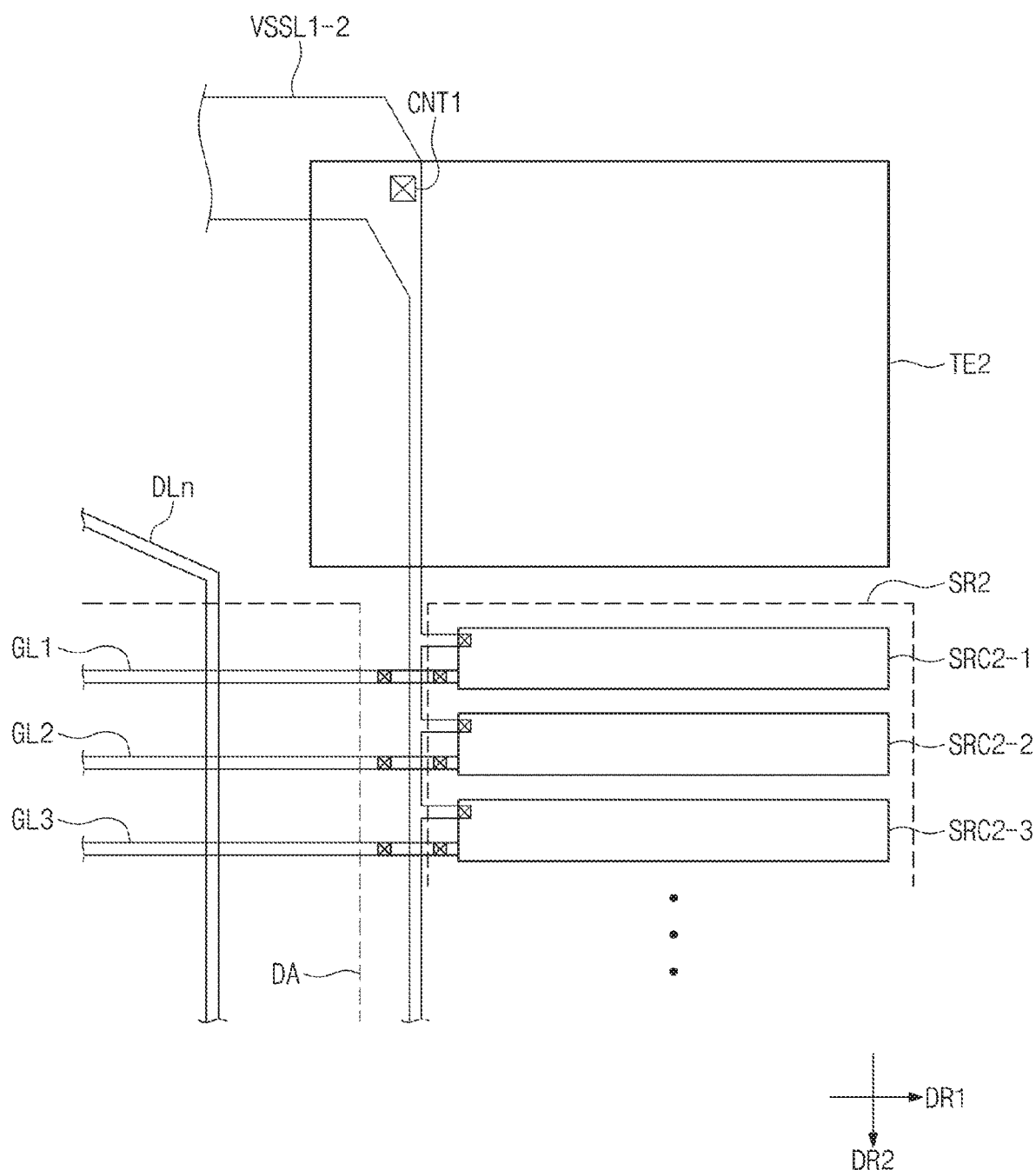
FIG. 4 is an enlarged view of a portion A1 illustrated in FIG. 3 according to some exemplary embodiments.

FIG. 3 is a plan view of a first substrate of the display apparatus of FIG. 1 according to some exemplary embodiments. FIG. 4 is an enlarged view of a portion A1 illustrated in FIG. 3 according to some exemplary embodiments.

Referring to FIGS. 3 and 4, the first and second gate drivers 210 and 220 are provided in the non-display area NDA of the first substrate 110. The first gate driver 210 is connected to one end of the gate lines GL1 to GLm, and the second gate driver 220 is connected to the other end of the gate lings GL1 to GLm. The first gate driver 210 includes a first shift register SR1 and a first control signal line providing a first gate control signal to the first shift register SR1. The second gate driver 220 includes a second shift register SR2 and a second control signal line providing a second gate control signal to the second shift register SR2.

The first shift register SR1 includes a plurality of stages connected in one-to-one correspondence to the gate lines GL1 to GLm, and the second shift register SR2 includes a plurality of stages SRC2-1, SRC2-2, and SRC2-3 connected in one-to-one correspondence to the gate lines GL1 to GLm.

A first control signal line may receive a first gate control signal through one of the flexible circuit substrates 320. The first control signal line may be extended along the second direction DR2 to provide the first gate control signal to the plurality of stages. The first control signal line may include a first clock signal line (not shown), a first clock bar signal line (not shown), and a first off voltage line VSSL1-1, etc. The first clock signal line and the first clock bar signal line are disposed in an area between the first shift register SR1 and one short side of the display panel 100 at which the first shift register SR1 is disposed, and the first off voltage line VSSL1-1 is disposed between the first shift register SR1 and the display area DA.

A second control signal line may receive a second gate control signal through one of the flexible circuit substrates 320. The second control signal line may be extended along the second direction DR2 to provide the second gate control signal to the plurality of stages. The second control signal line may include a second clock signal line (not shown), a second clock bar signal line (not shown), and a second off voltage line VSSL1-2, etc. The second clock signal line and the second clock bar signal line are disposed in an area between the second shift register SR2 and the other short side of the display panel 100 at which the second shift register SR2 is disposed, and the second off voltage line VSSL1-2 is disposed between the second shift register SR2 and the display area DA. The first and second off voltage lines VSSL1-1 and VSSL1-2 receive a first off voltage. As an example, the first off voltage may have a lower potential than the common voltage applied to the common electrode CE (see FIG. 2).

Trap electrodes TE1 to TE4 are disposed in the non-display area NDA of the first substrate 110. In some exemplary embodiments, the display area DA has a quadrilateral shape defined by the first and second directions DR1 and DR2, and the trap electrodes TE1 to TE4 are disposed adjacent to four corner portions of the display area DA. Each of the trap electrodes TE1 to TE4 may have a quadrilateral shape in a planar view. For example, each of the trap electrodes TE1 to TE4 has a square or rectangle shape, but exemplary embodiments are not limited thereto and are modifiable in various ways.

First and third trap electrodes TE1 and TE3 disposed adjacent to the first gate driver 210 among the trap electrodes TE1 to TE4 are electrically connected to the first off voltage line VSSL1-1 to receive the first off voltage from the first off voltage line VSSL1-1. Second and fourth trap electrodes TE2 and TE4 disposed adjacent to the second gate driver 220 among the trap electrodes TE1 to TE4 are electrically connected to the second off voltage line VSSL1-2 to receive the first off voltage from the second off voltage line VSSL1-2.

As shown in FIG. 4, the second shift register SR2 includes the plurality of stages
SRC2-1, SRC2-2 and SRC2-3 connected in one-to-one correspondence to the gate lines GL1, GL2 and GL3. Each of the plurality of stages SRC2-1, SRC2-2 and SRC2-3 is connected to the second off voltage line VSSL1-2 and receives the first off voltage. Gate signals output from the plurality of stages SRC2-1, SRC2-2 and SRC2-3 sequentially have a high period and are maintained at the first off voltage during a low period.

The second trap electrode TE2 is formed to overlap the second off voltage line VSSL1-2 and is electrically connected to the second off voltage line VSSL1-2 through the first contact hole CNT1. Accordingly, the second trap electrode TE2 may receive the first off voltage from the second off voltage line VSSL1-2.

Although not shown in FIG. 4, the fourth trap electrode TE4 (see FIG. 3) may be also disposed to overlap the second off voltage line VSSL1-2 and electrically connected to the second off voltage line VSSL1-2 through a corresponding contact hole.

Figure 5:
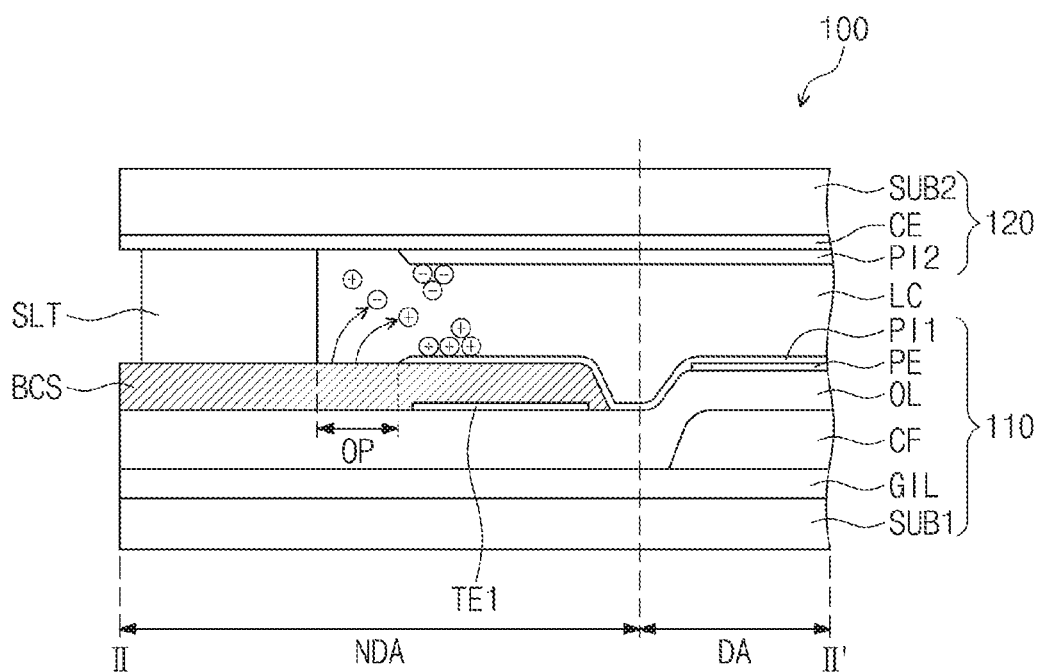
FIG. 5 is a cross-sectional view of the display apparatus of FIG. 1 taken along sectional line II-II' according to some exemplary embodiments.

FIG. 5 is a cross-sectional view of the display apparatus of FIG. 1 taken along sectional line II-II' according to some exemplary embodiments.

In relation to FIGS. 1, 3, and 5, the trap electrodes TE1 to TE4 are disposed on the organic insulation layer OL in the non-display area NDA, and covered with the light-shielding column spacer BCS. The trap electrodes TE1 to TE4 may be disposed on the same layer as the pixel electrode PE, formed of the same material as that of the pixel electrode PE, and patterned through the same process as the pixel electrode PE; however, exemplary embodiments are not limited thereto.

In addition, the trap electrodes TE1 to TE4 face the common electrode CE to form an electric field. The common voltage is applied to the common electrode CE and the first off voltage having a different potential from the common voltage is applied to the trap electrodes TE1 to TE4. As an example, the first off voltage may have a lower potential that the common voltage. For instance, the common voltage may be 7 V and the first off voltage may be −7 V.

When viewed from the top portion, the first alignment layer PI1 is disposed to be spaced apart from the sealing member SLT by a determined distance so as not to overlap the is sealing member SLT, and the top surface of the light-shielding column spacer BCS adjacent to the sealing member SLT is not covered with the first alignment layer PI1 and is exposed. Here, the exposed portion of the light-shielding column spacer BCS may be defined as an open area OP. Ionic impurities flowed out from the light-shielding column spacer BCS may be moved to a space between the first and second substrates 110 and 120 through the open area OP. Here, the ionic impurities may be trapped in an electric field space by an electric field formed between the trap electrodes TE1 to TE4 and the common electrode CE. For instance, ionic impurities having a negative polarity may be fixed to the common electrode CE having a relatively positive polarity, and ionic impurities having a positive polarity may be fixed to the top portion of the trap electrodes TE1 to TE4 having a relatively negative polarity. Accordingly, a phenomenon in which ionic impurities are moved to the display area DA side to contaminate the liquid crystal may be prevented or at least reduced.

Figure 6:
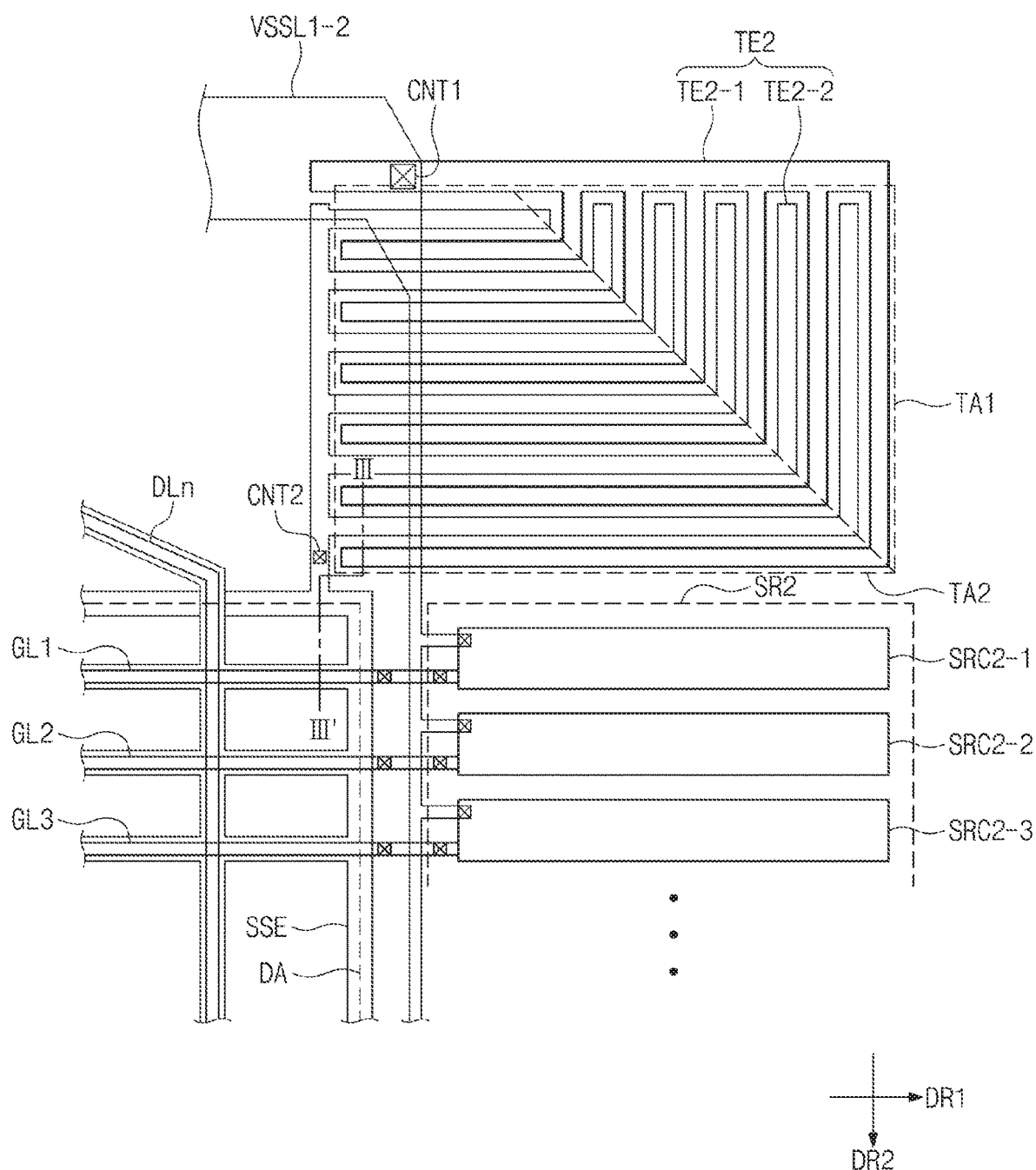
FIG. 6 is a plan view of a display panel including trap electrodes according to some exemplary embodiments.
Figure 7:
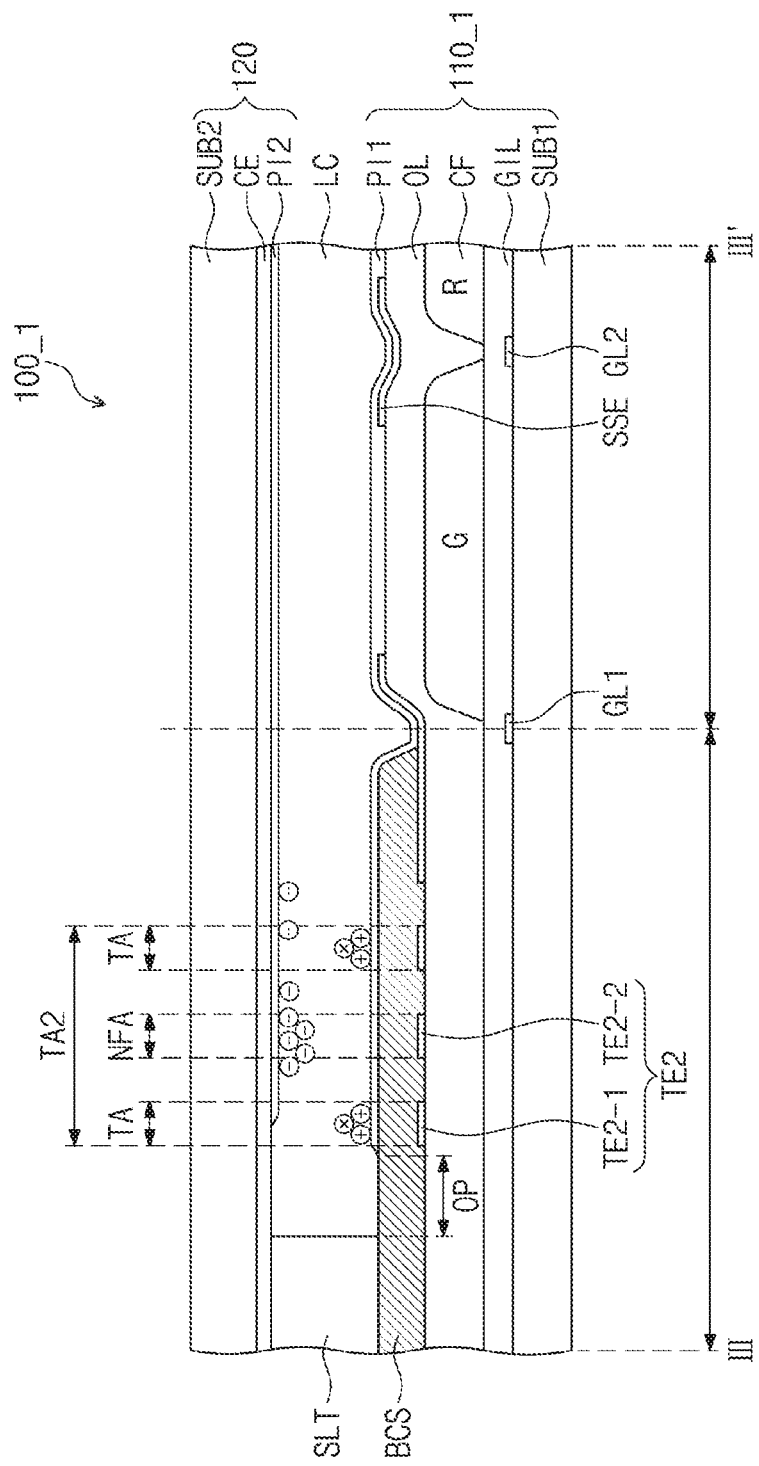
FIG. 7 is a cross-sectional view of the display panel of FIG. 6 taken along sectional line III-III' according to some exemplary embodiments.

FIG. 6 is a plan view of a display panel including trap electrodes according to some exemplary embodiments. FIG. 7 is a cross-sectional view of the display panel of FIG. 6 taken along sectional line III-III' according to some exemplary embodiments.

In relation to FIGS. 1, 6, and 7, a display panel 100_1 according to some exemplary embodiments further includes a shielding electrode SSE formed along the gate lines GL1 to GLm and data lines DL1 to DLn in the display area DA. The shielding electrode SSE may be formed in a mesh type in the display area DA, but is not limited thereto. As other examples, the shielding electrode SSE may be formed in a stripe type in the second direction DR2 along the data lines DL1 to DLn, or formed in a stripe type in the first direction DR1 along the gate lines GL1 to GLm.

The shielding electrode SSE is formed on the top portion of the gate lines GL1 to GLm and data lines DL1 to DLn. As an example, the shielding electrode SSE is disposed on the organic insulation layer OL and may be formed through the same process as that of the pixel electrode PE. A shielding electrode voltage having the same potential as the common voltage applied to the common electrode CE may be applied to the shielding electrode SSE. As such, a non-electric field area is formed between the shielding electrode SSE and the common electrode CE. In the non-electric field area, the liquid crystals of the liquid crystal layer LC are not aligned. Accordingly, light provided to the non-electric field does not penetrate the liquid crystal layer LC and is shielded. Accordingly, the shielding electrode SSE may form an area in which light is shielded, and as a result, the light-shielding column spacer BCS may not be formed in the area in which the shielding electrode SSE is formed. However, as another example, in order to doubly perform a light shielding function, the light-shielding column spacer BCS may be further formed on the shielding electrode SSE, or a portion of the shielding electrode SSE may overlap the light-shielding column spacer BCS.

Each of the trap electrodes TE1 to TE4 may include a first sub-trap electrode TE2-1 and a second sub-trap electrode TE2-2. The first sub-trap electrode TE2-1 is electrically connected to the second off voltage line VSSL1-2 to receive the first off voltage through a first contact hole CNT1. The second sub-trap electrode TE2-2 is electrically connected to the shielding electrode SSE to receive a shielding voltage through a second contact hole CNT2. The shielding electrode SSE has the same potential as the common voltage applied to the common electrode CE in order to form the non-electric field area.

As shown in FIGS. 6 and 7, the second trap electrode TE2 may be divided into two trap areas TA1 and TA2. In the first trap area TA1, the first sub-trap electrode TE2-1 and the second sub-trap electrode TE2-2 are alternately disposed in the first direction DR1, and in the second trap area TA2, the first sub-trap electrode TE2-1 and the second sub-trap electrode TE2-2 are alternately disposed in the second direction DR2.

In the first trap area TA1, a trap area TA in which the common electrode CE and the first sub trap electrode TE2-1 face each other, and a non-electric field area NFA in which the common electrode CE and the second sub-trap electrode TE2-2 face each other may be alternately formed. In the second trap area TA2, a trap area TA in which the common electrode CE and the first sub trap electrode TE2-1 face each other, and a non-electric field area NFA in which the common electrode CE and the second sub-trap electrode TE2-2 face each other may be alternately formed in the second direction DR2.

Ionic impurities flowed out from the light-shielding column spacer BCS may be moved to a space between the first and second substrates 110_1 and 120 through the open area OP. The ionic impurities may be trapped by an electric field formed between the first sub-trap electrode TE2-1 and the common electrode CE. For instance, ionic impurities having a negative polarity may be fixed to the common electrode CE having a relatively positive polarity, and ionic impurities having a positive polarity may be fixed to the top portion of the first sub-trap electrode TE2-1 having a relatively negative polarity. Accordingly, a phenomenon in which ionic impurities are moved to the display area DA side to contaminate the liquid crystal may be prevented or at least reduced.

Figure 8:
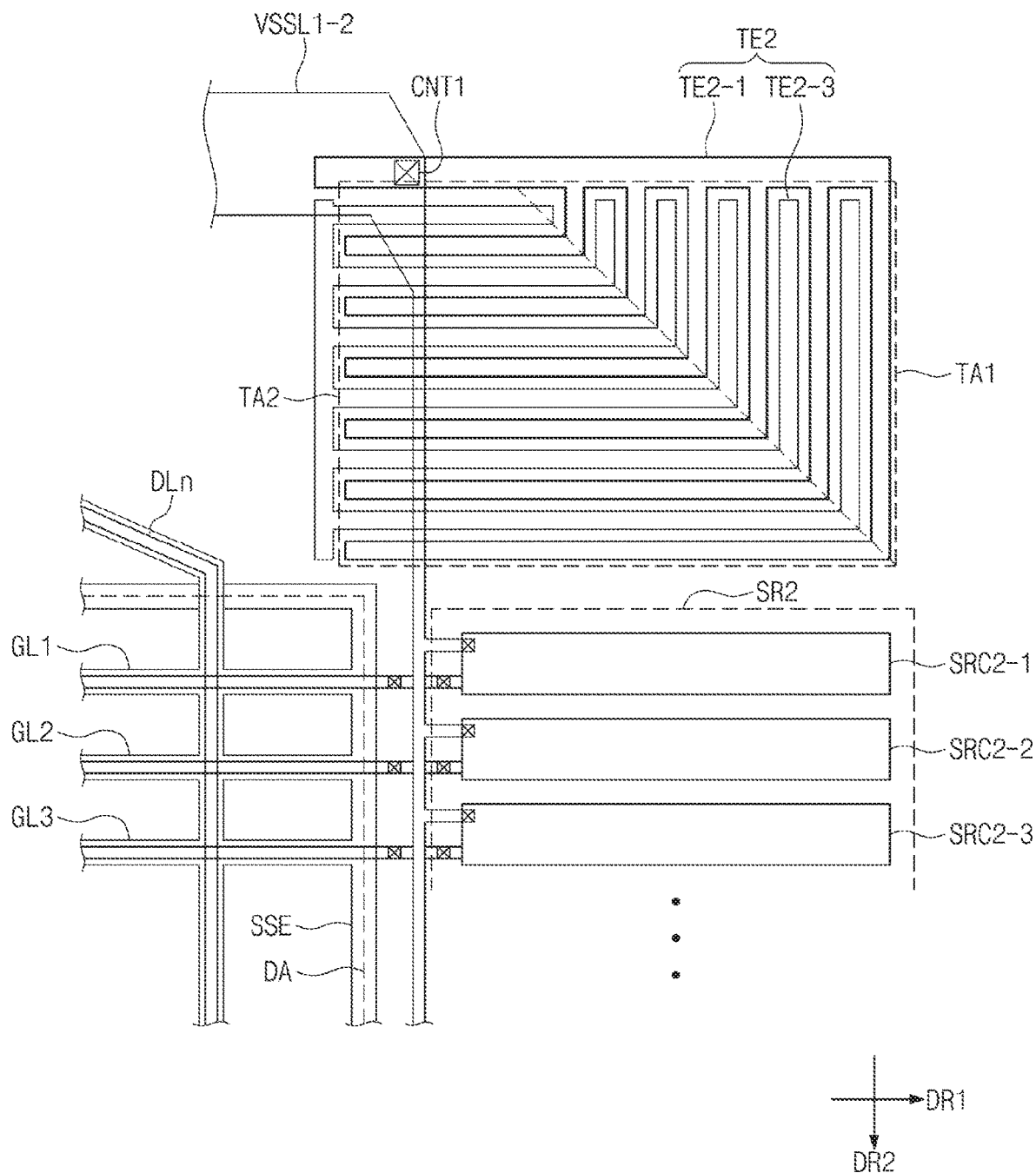
FIG. 8 is a plan view of a display panel including trap electrodes according to some exemplary embodiments.

FIG. 8 is a plan view of a display panel including trap electrodes according to some exemplary embodiments.

In relation to FIG. 8, each of the trap electrodes TE1 to TE4 may include a first sub-trap electrode TE2-1 and a third sub-trap electrode TE2-3. The first sub-trap electrode TE2-1 is electrically connected to the second off voltage line VSSL1-2 to receive the first off voltage through the first contact hole CNT1. The third sub trap electrode TE2-3 may be an electrode in a floating state. In other words, the third sub-trap electrode TE2-3 may be an electrode in an island form, which does not receive any signal from the outside.

As shown in FIG. 8, the second trap electrode TE2 may be divided into two trap areas TA1 and TA2. In the first trap area TA1, the first sub-trap electrode TE2-1 and the third sub-trap electrode TE2-3 are alternately disposed in the first direction DR1, and in the second trap area TA2, the first sub-trap electrode TE2-1 and the third sub-trap electrode TE2-3 are alternately disposed in the second direction DR2.

In the first trap area TA1, a trap area TA in which the common electrode CE (shown in FIG. 7) and the first sub-trap electrode TE2-1 face each other, and a floating area in which the common electrode CE and the third sub-trap electrode TE2-3 face each other may be alternately formed in the first direction DR1. In the second trap area TA2, a trap area TA in which the common electrode CE and the first sub-trap electrode TE2-1 face each other, and a floating area in which the common electrode CE and the third sub-trap electrode TE2-3 face each other may be alternately formed in the second direction DR2.

Ionic impurities may be trapped by an electric field formed between the first sub-trap electrode TE2-1 and the common electrode CE. For instance, ionic impurities having a negative polarity may be fixed to the common electrode CE having a relatively positive polarity, and ionic impurities having a positive polarity may be fixed to the top portion of the first sub-trap electrode TE2-1 having a relatively negative polarity. Accordingly, a phenomenon in which ionic impurities are moved to the display area DA side to contaminate the liquid crystal may be prevented or at least reduced.

Figure 9:
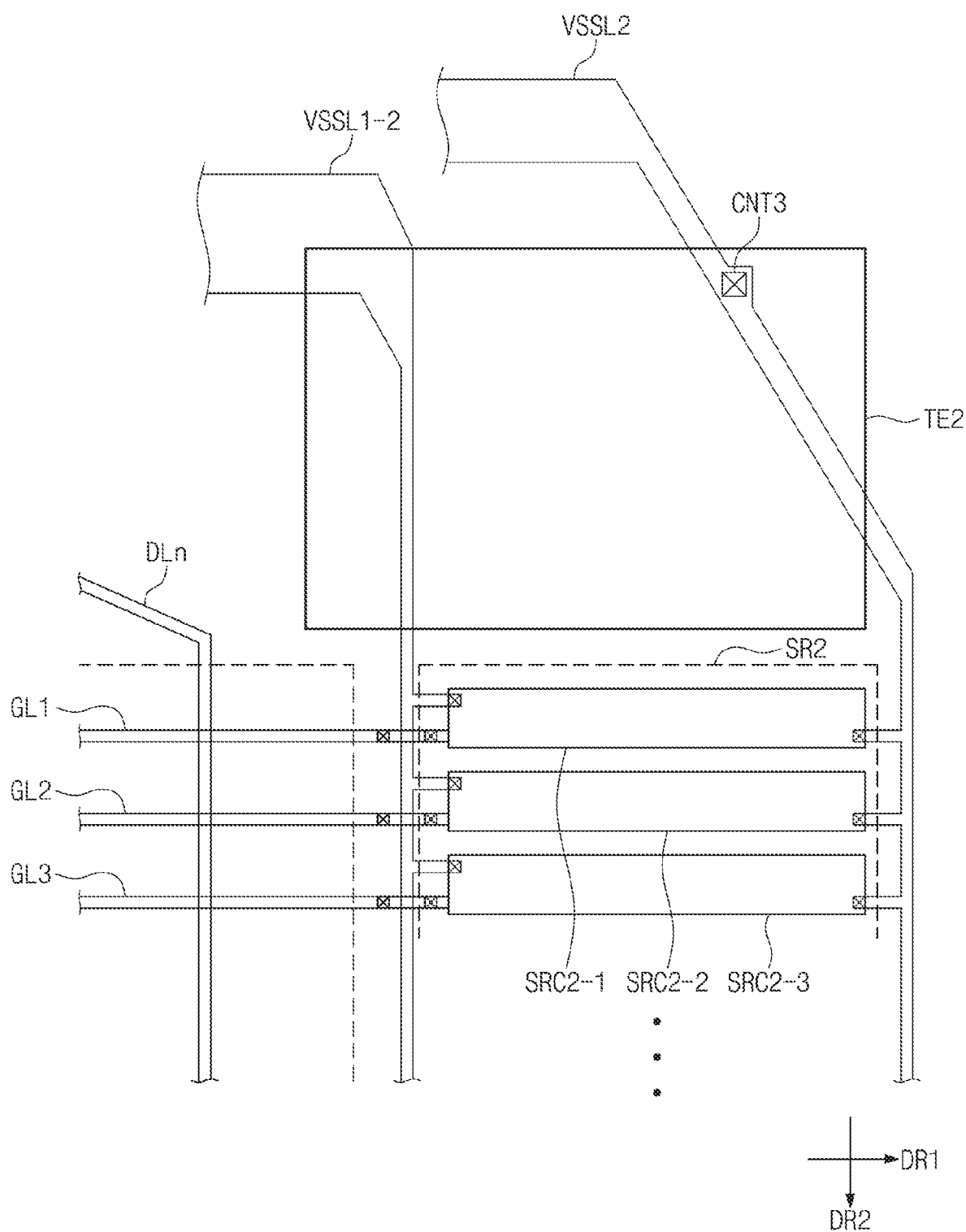
FIG. 9 is a plan view of a display panel including trap electrodes according to some exemplary embodiments.

FIG. 9 is a plan view of a display panel including trap electrodes according to is some exemplary embodiments.

In relation to FIG. 9, the first and second gate drivers 210 and 220 (shown in FIGS. 1 and 3) according to some exemplary embodiments may further receive a second off voltage. The second off voltage may have a lower level that the first off voltage.

The second gate driver 220 (see FIGS. 1 and 3) further includes a third off voltage line VSSL2 connected to the second shift register SR2. The third off voltage line VSSL2 is extended in the second direction DR2 along the plurality of stages SRC2-1, SRC2-2, and SRC2-3, and provides the second off voltage to the plurality of stages SRC2-1, SRC2-2, and SRC2-3.

The second off voltage line VSSL1-2 is disposed between the second shift register SR2 and the display area DA, while the third off voltage line VSSL2 is disposed in an area between a short side of the display panel 100 and the second shift register SR2. Exemplary embodiments, however, are not limited thereto.

Each of the trap electrodes TE1 to TE4 (see FIGS. 1 and 3) may receive the second off voltage. As shown in FIG. 9, the second trap electrode TE2 is electrically connected to the third off voltage line VSSL2 to receive the second off voltage from the third off voltage line VSSL2. The second trap electrode TE2 may overlap the third off voltage line VSSL2 and may be electrically connected to the third off voltage line VSSL2 through the third contact hole CNT3. Accordingly, the second trap electrode TE2 may receive the second off voltage from the third off voltage line VSSL2.

Although not shown in FIG. 9, the fourth trap electrode TE4 (see FIG. 3) may also overlap the third off voltage line VSSL2 and may be electrically connected to the third off voltage line VSSL2 through a corresponding contact hole to receive the second off voltage from the third off voltage line VSSL2.

Figure 10:
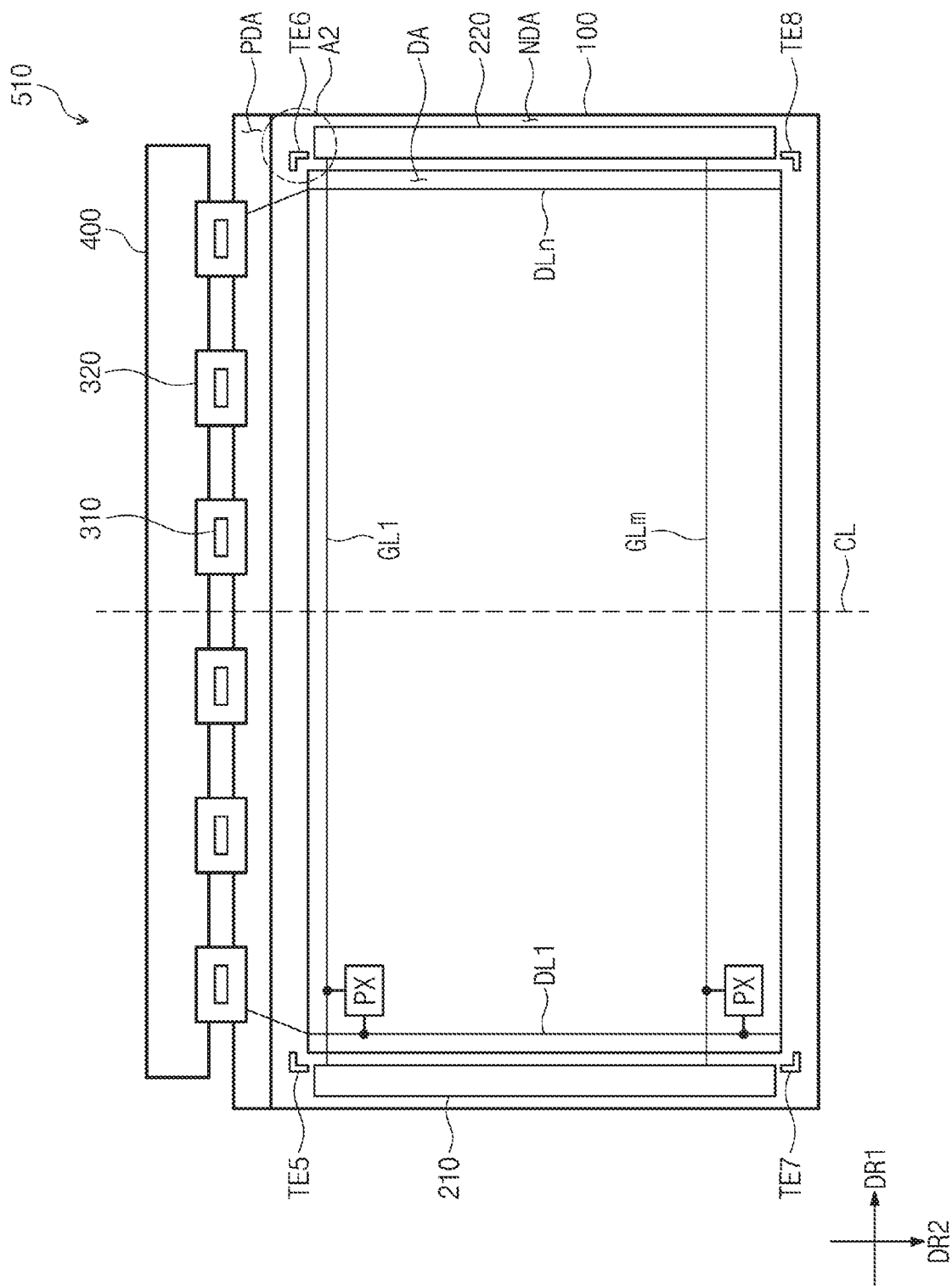
FIG. 10 is a plan view of a display apparatus including trap electrodes according to some exemplary embodiments.
Figure 11:
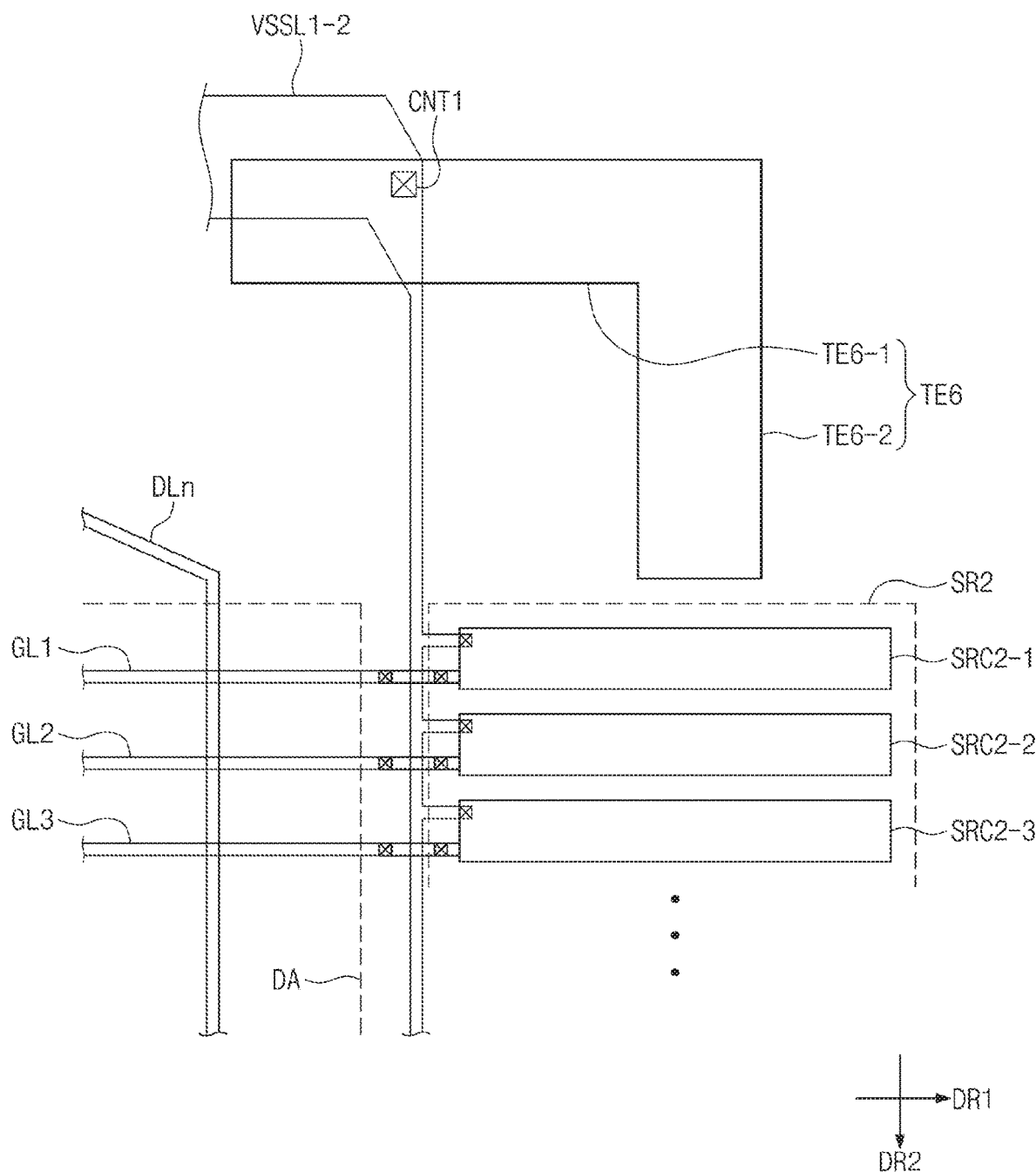
FIG. 11 is an enlarged plan view of a portion A2 illustrated in FIG. 10 according to some exemplary embodiments.

FIG. 10 is a plan view of a display apparatus including a trap electrode according to some exemplary embodiments. FIG. 11 is an enlarged plan view of a portion A2 illustrated in FIG. 10 according to some exemplary embodiments. Among elements illustrated in FIG. 10, the same elements as those illustrated in FIG. 1 are denoted by the same reference numerals and duplicative detailed descriptions will be primarily omitted.

Referring to FIG. 10, display apparatus 510 includes trap electrodes TE5 to TE8 according to some exemplary embodiments. The trap electrodes TE5 to TE8 are disposed in the non-display area NDA adjacent to four corner portions of the display area DA. The display area DA has a quadrilateral shape defined by the first and second directions DR1 and DR2, and each of the trap electrodes TE5 to TE8 may have a character "L" shape in a planar view, which may be rotated based on a respective position of the trap electrodes TE5 to TE8.

Fifth and seventh trap electrode TE5 and TE7 among the trap electrodes TE5 to TE8 are disposed adjacent to the first gate driver 210, and the sixth and eighth trap electrodes TE6 and TE8 are disposed adjacent to the second gate driver 220. The fifth and sixth trap electrodes TE5 and TE6 have a symmetrical shape with reference to a center line CL passing through the center of the display panel 100, and the seventh and eighth trap electrodes TE7 and TE8 have a symmetrical shape with reference to the center line CL.

As shown in FIG. 11, the sixth trap electrode TE6 includes a first trap part TE6-1 extended in parallel with a first direction DR1 and a second trap part TE6-2 extended in parallel with the second direction DR2 from one end of the first trap part TE6-1. The first trap part TE6-1 overlaps the second off voltage line VSSL1-2, and is electrically connected to the second off voltage line VSSL1-2 through the first contact hole CNT1 to receive the first off voltage from the second off voltage line VSSL1-2. Although a structure in which the first trap part TE6-1 overlaps the second off voltage line VSSL1-2 is illustrated in FIG. 11, the second trap part TE6-2 and the second off voltage line VSSL1-2 may overlap each other according to a design of the display apparatus 510. Although not shown in FIG. 11, the eighth trap electrode TE8 (see FIG. 10) may also overlap the second off voltage line VSSL1-2 and may be electrically connected to the second off voltage line VSSL1-2 through a corresponding contact hole.

Figure 12:
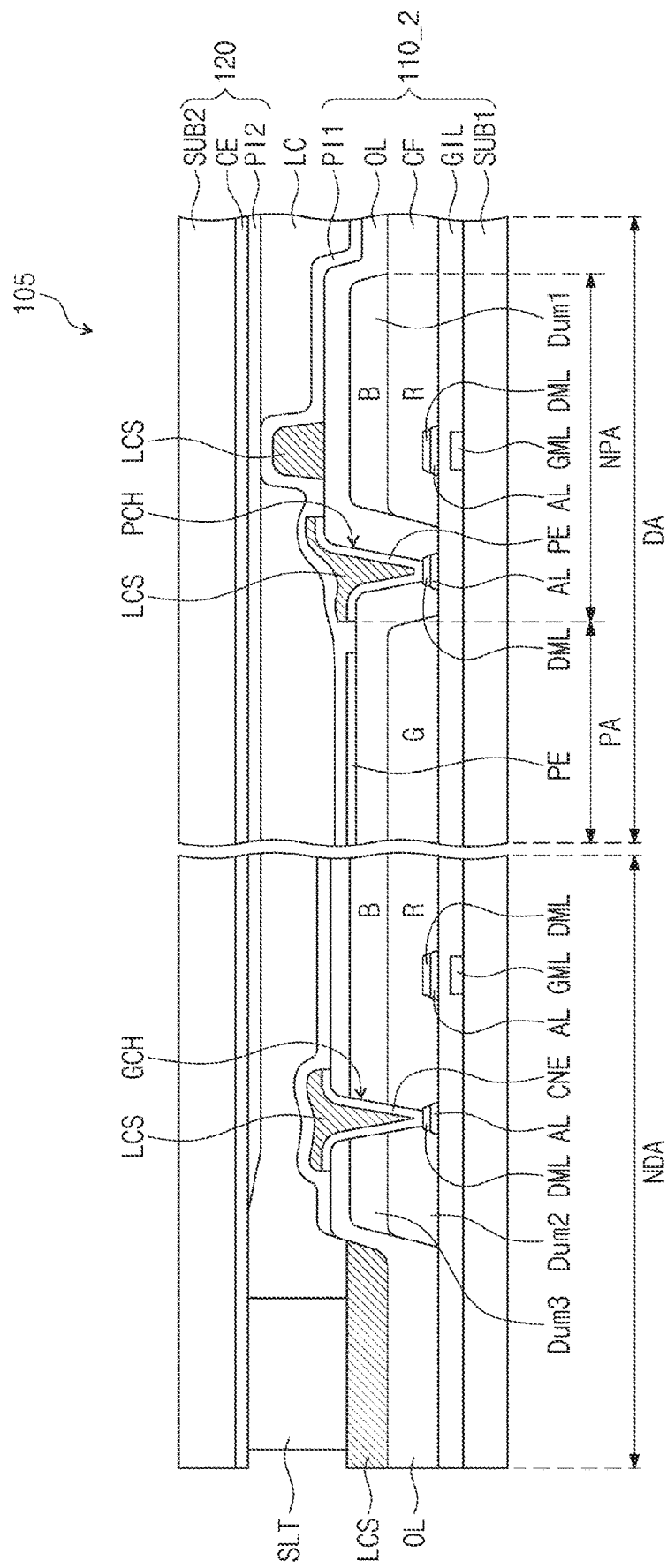
FIG. 12 is a cross-sectional view of a display apparatus according to some exemplary embodiments.

FIG. 12 is a cross-sectional view of a display apparatus according to some exemplary embodiments. Among elements illustrated in FIG. 12 of display panel 105 of the display apparatus, the same elements as those illustrated in FIG. 2 are denoted by the same reference numerals and detailed descriptions thereof will be primarily omitted.

In relation to FIG. 12, the first substrate 110_2 includes a first base substrate SUB1, a gate metal layer GML, a gate insulation layer GIL, an active layer AL, a data metal layer DML, a color filter layer CF, an organic insulation layer OL, a pixel electrode PE, a low reflection column spacer LCS, and a first alignment layer PI1. The second substrate 120 includes a second base substrate SUB2, a common electrode CE, and a second alignment layer PI2. The liquid crystal layer LC is disposed between the first base substrate SUB1 and second base substrate SUB2.

The color filter layer CF may be disposed to cover the data metal layer DML. The color filter layer CF includes a red color filter R, green color filter G, and blue color filter B. The color filter layer CF may be disposed in a display area DA and a non-display area NDA.

The color filter layer CF may be disposed in a pixel area PA and a non-pixel area NPA of the display area DA.

The color filter layer CF in the non-pixel area NPA may further include a first dummy color filter Dum1. For example, in a red pixel in which the red color filter R is disposed is in the pixel area PA, the blue color filter B may be disposed as the first dummy color filter Dum1 in the non-pixel area NPA of the red pixel. As another example, in a green pixel in which the green color filter G is disposed in the pixel area PA, a red color filter (not shown) may be disposed as the first dummy color filter Dum1 in the non-pixel area NPA of the green pixel. The first dummy color filter Dum1 of each pixel PX may be formed of one of color filters having different colors from the color filter disposed in the corresponding pixel area PA.

The color filter layer CF in the non-display area NDA includes a second dummy color filter Dum2 and a third dummy color filter Dum3. The second dummy color filter Dum2 may be provided on the gate insulation layer GIL, and the third dummy color filter Dum3 may be provided on the second dummy color filter Dum2. As an example, the red color filter R may be provided as the second dummy color filter Dum2, the blue color filter B may be provided on the second dummy color filter Dum2 as the third dummy color filter Dum3, but the inventive concepts are not limited thereto.

The organic insulation layer OL may be disposed on the color filter layer CF.

Although a structure in which the color filter layer CF is covered with the organic insulation layer OL is shown as an example, the color filter layer CF may be covered with a passivation layer formed of an inorganic material. The display panel 105 may selectively include the passivation layer and the organic insulation layer OL, or include both of them as another example. When the display panel 105 includes both of the passivation layer and the organic insulation layer OL, the organic insulation layer OL may be disposed on the passivation layer. On the other hand, in an area in which the color filter layer CF is not provided, the data metal layer DML or the gate insulation layer GIL may be covered with the organic insulation layer OL.

The organic insulation layer OL may include a contact part exposing the data metal layer DML. The contact part may include a pixel contact hole PCH exposing an output electrode of a transistor in the pixel PX, and a gate contact hole GCH exposing electrodes for an electrical contact of each element in the gate drivers 210 and 220. For instance, in an area in which the pixel contact hole PCH is formed, a contact hole having the larger size than the pixel contact hole PCH is formed in the color filters CF to expose portions of the data metal layer DML and the gate insulation layer GIL. The pixel contact hole PCH may be located in the non-pixel area NPA.

Pixel electrodes PE are disposed on the organic insulation layer OL. The pixel electrodes PE are disposed in the pixel area PA of the pixels PX and partially extended to the non-pixel area NPA to electrically contact the output electrode of the transistor of the corresponding pixel through the pixel contact hole PCH.

A connection electrode CNE is disposed on the organic insulation layer OL in the non-display area NDA. The connection electrode CNE contacts the exposed electrodes through the gate contact hole GCH so as to electrically connect elements of the gate drivers 210 and 220 to each other.

In correspondence with the non-display area NDA and the non-pixel area NPA, the low reflection column spacer LCS is disposed on a portion of the organic insulation layer OL, the pixel contact hole PCH, and the gate contact hole GCH. The low reflection column spacer LCS may be formed of an organic material including a low reflection material.

The low reflection column spacer LCS may maintain a cell gap between the first substrate 110_2 and the second substrate 120. For example, in an area in which the first dummy color filter Dum1 is formed, the top surface of the organic insulation layer OL is disposed higher than in other areas. Accordingly, when the low reflection column spacer LCS is formed on the organic insulation layer OL in the area in which the first dummy color filer Dum1 is formed, the low reflection column spacer LCS may support the second substrate 120.

According to some exemplary embodiments, the first dummy color filter Dum1 may be disposed on the transistor in the non-pixel area NPA. The portion of the non-pixel area NPA with the transistor disposed therein is formed to be higher than other portions of the non-pixel area NPA without the transistor disposed therein. Accordingly, a step-difference due to the transistor and a step-difference due to the first dummy color filter Dum1 all contribute to the protrusion shape of the low reflection column spacer LCS.

In addition, the low reflection column spacer LCS may be formed on the pixel contact hole PCH and the gate contact hole GCH to cover the pixel electrode PE and the connection electrode CNE. The low reflection column spacer LCS is disposed to cover the pixel electrode PE located in the non-pixel area NPA, and is disposed to cover the connection electrode CNE located in the non-display area NDA. Accordingly, external light is prevented from being reflected by the pixel electrode PE and the connection electrode CNE to allow the external light not to be visually recognized by a user.

The first alignment layer PI1 is disposed to cover the low reflection column spacer LCS, a portion of the organic insulation layer OL, the pixel electrode PE, and the connection electrode CNE. The first alignment layer PI1 is disposed on the top surface of the low reflection column spacer LCS in the transistor area. Accordingly, a portion of the first alignment layer PI1 disposed on the top surface of the low reflection column spacer LCS may contact the second alignment layer PI2 of the second substrate 120.

When viewed from the top portion, the low reflection column spacer LCS may overlap the sealing member SLT in the non-display area NDA. To strengthen contact force with the first substrate 110_2, the sealing member SLT does not overlap the first alignment layer PI1 in a planar view. In other words, the first alignment layer PI1 is spaced apart from the sealing member SLT by a determined distance. Accordingly, the top surface of the low reflection column spacer LCS may be exposed between the sealing member SLT and the first alignment layer PI1. Similarly, to strengthen contact force with the second substrate 120, the second alignment layer PI2 does not overlap the sealing member SLT in a planar view.

Figure 13:
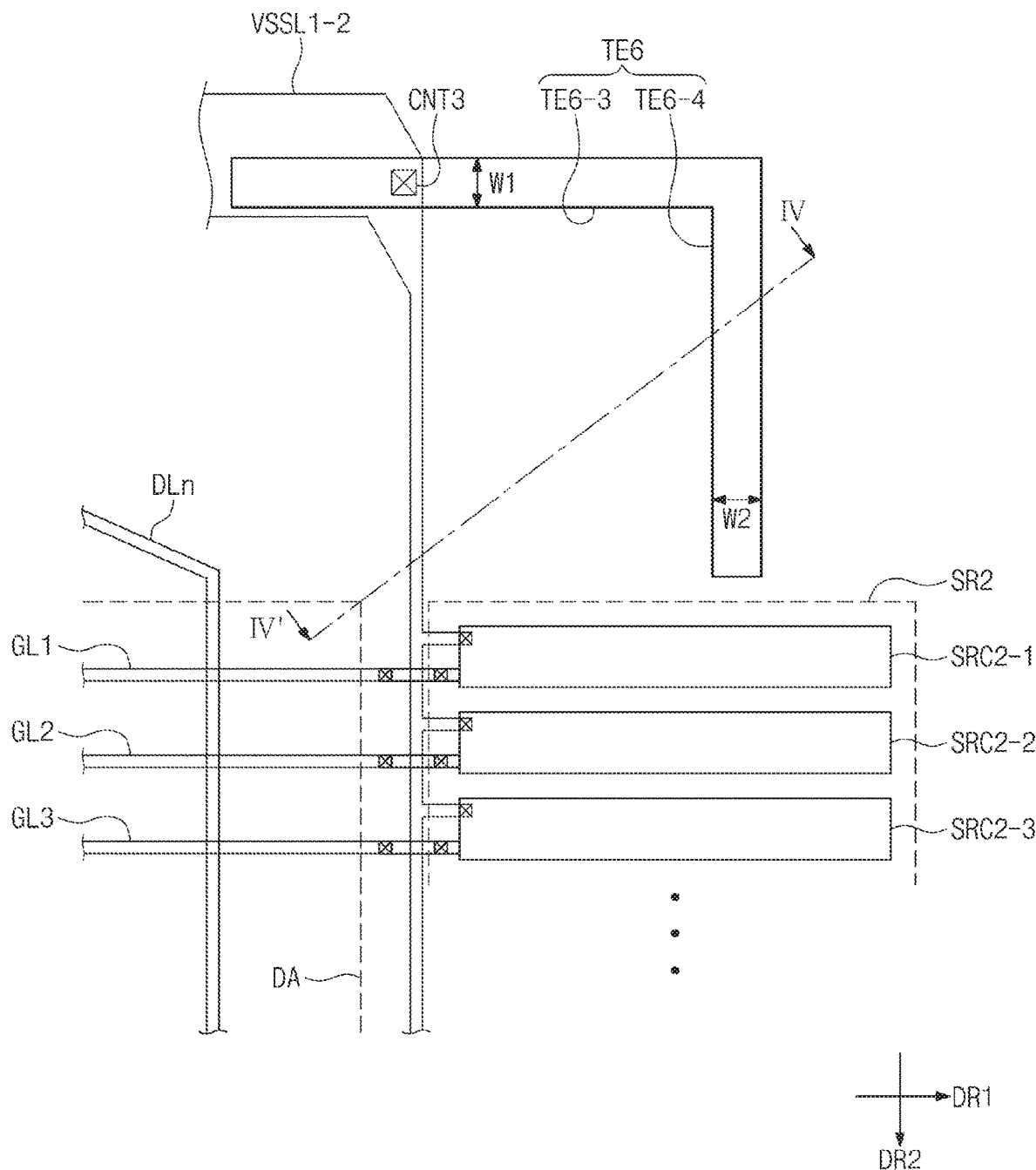
FIG. 13 is a plan view illustrating a trap electrode applied in association with the display apparatus illustrated in FIG. 12 according to some exemplary embodiments.
Figure 14:
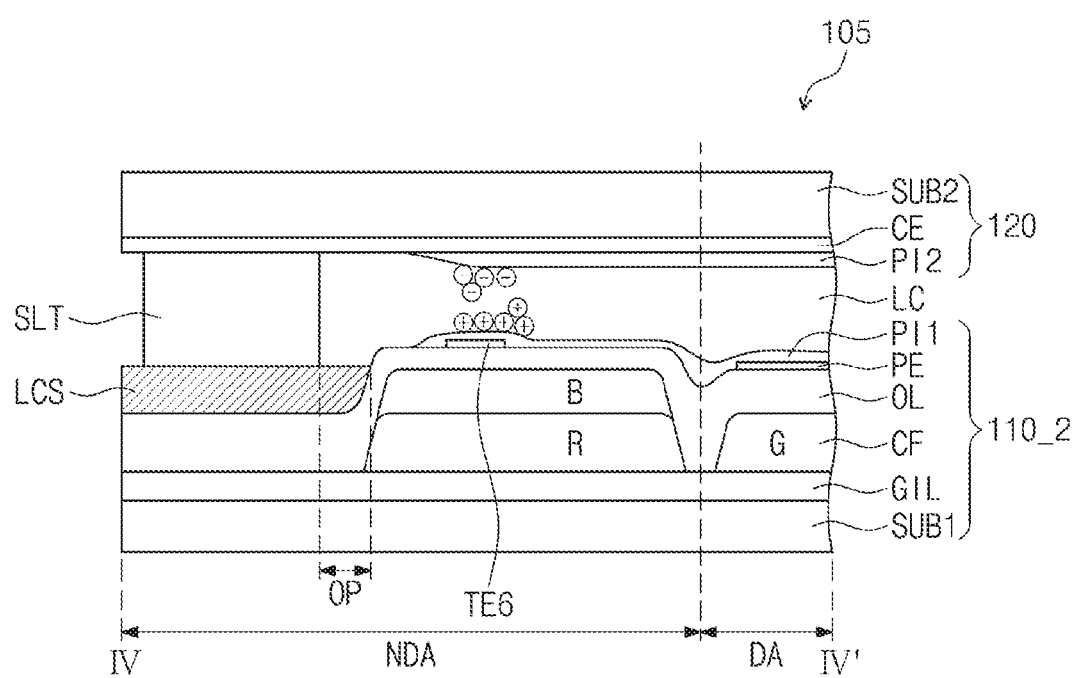
FIG. 14 is a cross-sectional view of the display apparatus of FIG. 13 taken along sectional line IV-IV' according to some exemplary embodiments.

FIG. 13 is a plan view illustrating a trap electrode applied in association with the display apparatus illustrated in FIG. 12 according to some exemplary embodiments. FIG. 14 is a cross-sectional view of the display apparatus of FIG. 13 taken along sectional line IV-IV' according to some exemplary embodiments.

Referring to FIGS. 12, 13, and 14, the display apparatus shown in FIG. 12 includes trap electrodes TE5 and TE6. As shown in FIGS. 13 and 14, a sixth trap electrode TE6 includes a third trap part TE6-3 extended in parallel with the first direction DR1 and a fourth trap part TE6-4 extended in parallel with the second direction DR2 from one end of the third trap part TE6-3. The third trap part TE6-3 overlaps the second off voltage line VSSL1-2 and is electrically connected to the second off voltage line VSSL1-2 through the third contact hole CNT3 so as to receive the first off voltage from the second off voltage line VSSL1-2. Although a structure in which the third trap part TE6-3 and the second off voltage line VSSL1-2 overlap is illustrated in FIG. 13, the fourth trap part TE6-4 and the second off voltage line VSSL1-2 may overlap according to a design of the display apparatus.

In addition, the sixth trap electrode TE6 faces the common electrode CE to form an electric field. The common voltage is applied to the common electrode CE, and the first off voltage having a different potential from the common voltage is applied to the sixth trap electrode TE6. As an example, the first off voltage may have a lower potential than the common voltage. For instance, the common voltage may be 7 V and the first off voltage may be −7 V.

When viewed from the top portion, the first alignment layer PI1 is spaced apart from the sealing member SLT by a determined distance so as not to overlap the sealing member SLT, and thus, the top surface of the low reflection column spacer LCS adjacent to the sealing member SLT is not covered by the first alignment layer PI1 and is exposed. The exposed portion of the low reflection column spacer LCS may be defined as an open area OP. Ionic impurities flowed out from the low reflection column spacer LCS may be moved to a space between the first and second substrates 110_2 and 120 through the open area OP. Here, the ionic impurities may be trapped in an electric field space by the electric field formed between the sixth trap electrode TE6 and the common electrode CE. For instance, ionic impurities having a negative polarity may be fixed to the common electrode CE having a relatively positive polarity, and ionic impurities having a positive polarity may be fixed to the top portion of the sixth trap electrode TE6 having a relatively negative polarity. Accordingly, a phenomenon in which the ionic impurities are moved to the display area DA side to contaminate the liquid crystal may be prevented or at least reduced.

According to some exemplary embodiments, the third trap part TE6-3 may have a first width W1 in the second direction DR2, and the fourth trap part TE6-4 may have a second width W2 in the first direction DR1. As shown in FIG. 14, the low reflection column spacer LCS is not provided on the third trap part TE6-3 and the fourth trap part TE6-4. When the first and second widths W1 and W2 of the third trap part TE6-3 and the fourth trap part TE6-4 increase, external light is reflected by the third trap part TE6-3 and the fourth trap part TE6-4 to be visually recognized by the user. Accordingly, the widths W1 and W2 of the third trap part TE6-3 and the fourth trap part TE6-4 may be set within a range in which the reflection light is not visually recognized.

Figure 15:
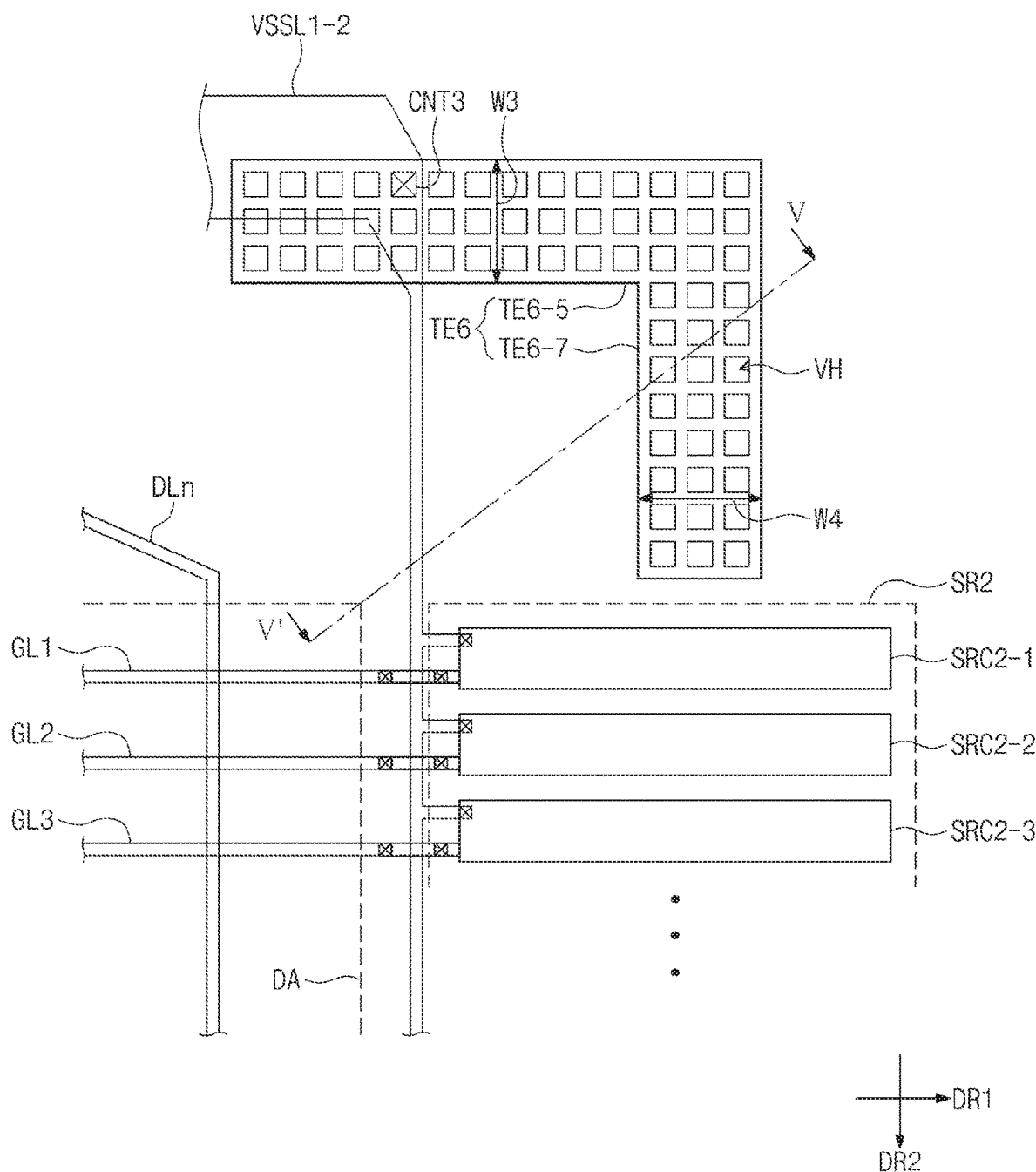
FIG. 15 is a plan view of a trap electrode applied in association with the display apparatus illustrated in FIG. 12 according to some exemplary embodiments.
Figure 16:
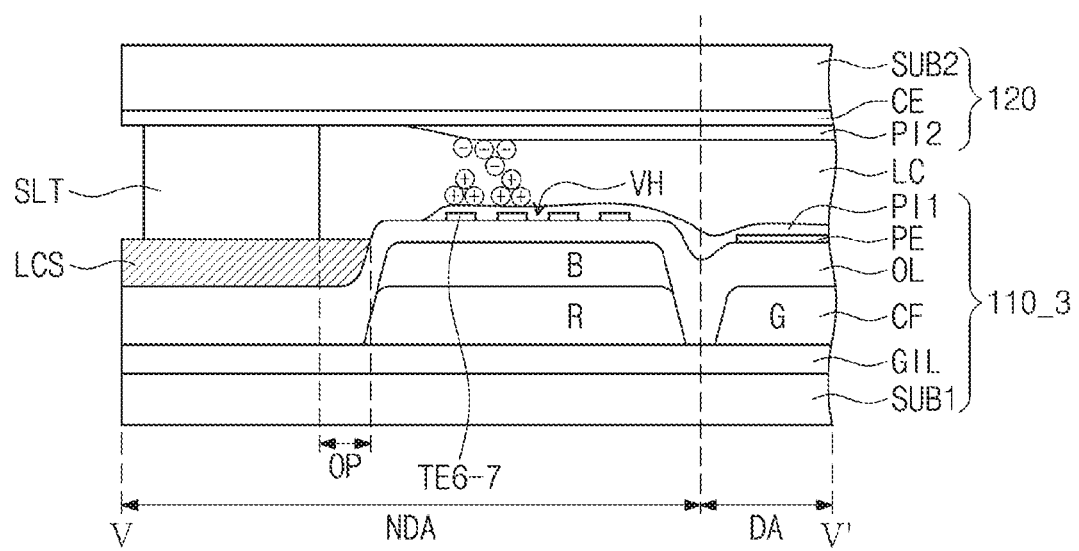
FIG. 16 is a cross-sectional view of the display apparatus of FIG. 15 taken along sectional line V-V' according to some exemplary embodiments.

FIG. 15 is a plan view of a trap electrode applied in association with the display apparatus illustrated in FIG. 12 according to some exemplary embodiments. FIG. 16 is a cross-sectionalview of the display apparatus of FIG. 15 taken along sectional line V-V' according to some exemplary embodiments.

As shown in FIGS. 15 and 16, the first substrate 110_3 includes the sixth trap electrode TE6 having a fifth trap part TE6-5 extended in parallel with the first direction DR1 and a sixth trap part TE6-6 extended in parallel with the second direction DR2 from one end of the fifth trap part TE6-5. The fifth trap part TE6-5 may have the third width W3 in the second direction DR2, and the sixth trap part TE6-6 may have the fourth width W4 in the first direction DR1. The third width W3 may be larger than the first width W1 of the third trap part TE6-3, and the fourth width W4 may be larger than the second width W2 of the fourth trap part TE6-4.

In some exemplary embodiments, the fifth trap part TE6-5 and the sixth trap part TE6-6 may include an opening part VH. The opening part VH may be defined as a quadrilateral shape in a planar view, but exemplary embodiments are not limited thereto, and may have any suitable polygonal shape. The opening part VH is defined as an area from which a trap electrode removed. Accordingly, even though the third and fourth widths W3 and W4 of the fifth trap part TE6-5 and the sixth trap part TE6-6 are larger than the first and second widths W1 and W2 of the third trap part TE6-3 and the fourth trap part TE6-4, respectively, the total area in which the sixth trap electrode TE6 is formed is not largely increased by the opening part VH. Accordingly, a trap effect of the ionic impurities may be enhanced, while the reflection phenomenon of external light may be reduced.

Figure 17:
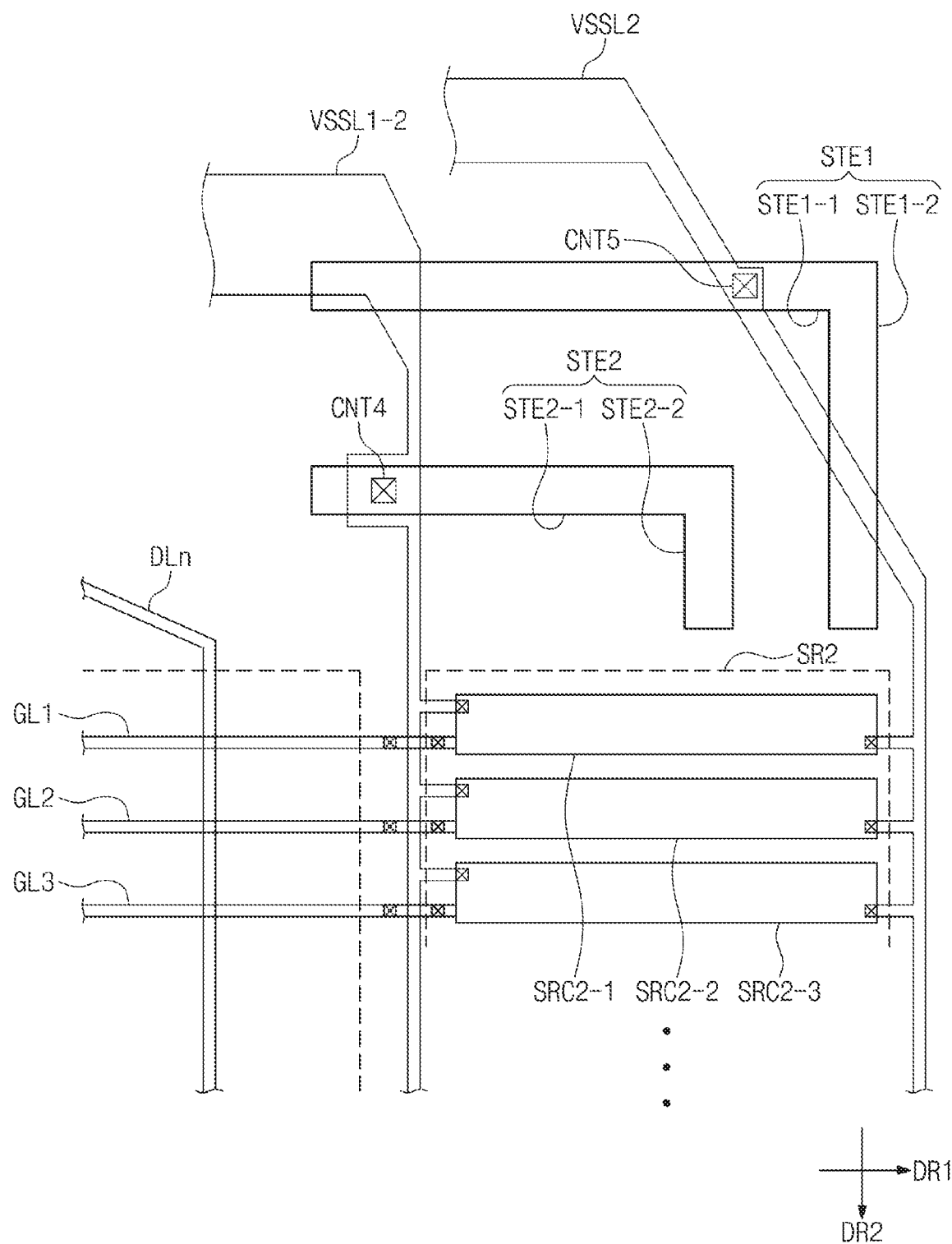
FIG. 17 is a plan view illustrating a trap electrode applied in association with the display apparatus illustrated in FIG. 12 according to some exemplary embodiments.

FIG. 17 is a plan view illustrating a trap electrode applied in association with the display apparatus illustrated in FIG. 12 according to some exemplary embodiments.

In relation to FIG. 17, a display apparatus according to some exemplary embodiments further includes a third off voltage line VSSL2 providing the second off voltage to the first and second gate drivers 210 and 220 (see FIGS. 1 and 3). The third off voltage line VSSL2 is extended in the second direction DR2 along the plurality of stages SRC2-1, SRC2-2, and SRC2-3, and provides the second off voltage to the plurality of stages SRC2-1, SRC2-2, and SRC2-3.

The display apparatus may include a first sub-trap electrode STE1 connected to the third off voltage line VSSL2 to receive the second off voltage, and a second sub trap electrode STE2 connected to the second off voltage line VSSL1-2 to receive the first off voltage. As shown in FIG. 17, the first sub-trap electrode STE1 is electrically connected to the third off voltage line VSSL2 through a fifth contact hole CNT5, and the second sub-trap electrode STE2 is electrically connected to the second off voltage line VSSL1-2 through a fourth contact hole CNT4. The first sub-trap electrode STE1 includes a first sub-trap part STE1-1 extended in the first direction DR1 and a second sub-trap part STE1-2 extended in the second direction DR2 from one end of the first sub-trap part STE1-1. The second sub-trap electrode STE2 includes a third sub-trap part STE2-1 extended in the first direction DR1 and a fourth sub-trap part STE2-2 extended in the second direction DR2 from one end of the third sub-trap part STE2-1. The third sub-trap part STE2-1 is parallel with the first sub-trap part STE1-1 and is disposed closer to the display area DA than the first sub-trap part STE1-1, and the fourth sub-trap part STE2-2 is parallel with the second sub-trap part STE1-2 and is disposed closer to the display area DA than the second sub-trap part STE1-2.

When the second off voltage is applied to each of the gate drivers 210 and 220, two sub-trap electrodes STE1 and STE2, which respectively receive the first and second off voltages, may be disposed adjacent to each corner portion of the display area DA. In this way, when the two sub-trap electrodes STE1 and STE2 are applied, the trap effect may be enhanced without forming the widths of the sub-trap electrodes STE1 and STE2 wide. In addition, the sub-trap electrodes STE1 and STE2 have relatively thin widths, and thus, the reflection phenomenon of external light may be reduced.

According to various exemplary embodiments, ionic impurities may be trapped by an electric field formed between trap electrodes and a common electrode. To this end, ionic impurities having a negative polarity among the ionic impurities may be fixed (or otherwise attracted) to a common electrode having a relatively positive polarity, and ionic impurities having a positive polarity may be fixed (or otherwise attracted) to upper portions of trap electrodes having a relatively negative polarity. Accordingly, a phenomenon in which ionic impurities are moved to a display area side to contaminate a liquid crystal may be prevented or at least reduced. As such, display defects may be avoided and display quality may be ensured.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. A display apparatus comprising:
a first base substrate comprising a display area and a non-display area;
a second base substrate configured to face the first base substrate;
a liquid crystal layer disposed between the first base substrate and the second base substrate;
a color filter layer disposed on the first base substrate in the display area;
pixel electrodes disposed on the color filter layer;
a light-shielding column spacer disposed on the first base substrate in the non-display area, the light-shielding column spacer comprising a light-shielding material;
a common electrode disposed on the second base substrate and configured to face the pixel electrodes, the liquid crystal layer disposed between the common electrode and the pixel electrodes; and
trap electrodes disposed on a lower portion of the light-shielding column spacer and facing the common electrode.

2. The display apparatus of claim 1, wherein:
the common electrode is configured to receive a common voltage; and
the trap electrodes are configured to receive a trap voltage having a lower potential than the common voltage.

3. The display apparatus of claim 2, further comprising:
a sealing member disposed between the first base substrate and the second base substrate, the sealing member bonding the first base substrate and the second base substrate and sealing the liquid crystal layer,
wherein the sealing member is disposed on the light-shielding column spacer in the non-display area.

4. The display apparatus of claim 3, further comprising:
a first alignment layer disposed on the light-shielding column spacer in the non-display area and spaced apart from the sealing member so as not to overlap the sealing member in a plan view; and a second alignment layer disposed on the common electrode in the non-display area and spaced apart from the sealing member so as not to overlap the sealing member in the plan view.

5. The display apparatus of claim 1, wherein:
the display area has a quadrilateral shape defined in a first direction and a second direction perpendicular to the first direction; and
the trap electrodes are disposed adjacent to four corners of the display area.

6. The display apparatus of claim 5, further comprising:
gate lines disposed on the first base substrate in the display area and extending in the first direction;
data lines disposed on the first base substrate in the display area and extending in the second direction; and
a gate driver disposed on the non-display area, the gate driver being configured to provide a gate signal to the display area.

7. The display apparatus of claim 6, wherein:
the gate driver comprises at least one among first and second gate drivers respectively connected to opposing ends of the gate lines;
each of the first and second gate drivers comprises:
a shift register configured to generate the gate signal; and
a first off voltage line configured to provide a first off voltage to the shift register.

8. The display apparatus of claim 7, wherein the trap electrodes are electrically connected to the first off voltage line and configured to receive the first off voltage.

9. The display apparatus of claim 7, further comprising:
a shielding electrode disposed on the first base substrate in the display area and extending along at least one of the gate lines and the data lines, the shielding electrode being configured to receive a shielding voltage having an equivalent potential to the common voltage.

10. The display apparatus of claim 9, wherein each of the trap electrodes comprises:
first sub-trap electrodes electrically connected to the first off voltage line and configured to receive the first off voltage; and
second sub-trap electrodes connected to the shielding electrode and configured to receive the shielding voltage.

11. The display apparatus of claim 10, wherein the first and second sub-trap electrodes are alternately disposed in the first direction and the second direction.

12. The display apparatus of claim 7, wherein each of the trap electrodes comprises:
first sub-trap electrodes electrically connected to the first off voltage line and configured to receive the first off voltage; and
second sub-trap electrodes in an electrically floating state.

13. The display apparatus of claim 12, wherein the first and second sub-trap electrodes are alternately disposed in the first direction and the second direction.

14. The display apparatus of claim 7, wherein each of the first and second gate drivers comprises a third off voltage line configured to provide a second off voltage to the shift register.

15. The display apparatus of claim 14, wherein the trap electrodes are electrically connected to the third off voltage line and configured to receive the second off voltage.

16. The display apparatus of claim 14, wherein each of the trap electrodes comprises:

first sub-trap electrodes electrically connected to the first off voltage line and configured to receive the first off voltage; and
second sub-trap electrodes electrically connected to the third off voltage line and configured to receive the second off voltage.

17. The display apparatus of claim 1, wherein:
the display area comprises pixel areas and a non-pixel area outside the pixel areas; and
the color filter layer comprises:
red, green, and blue color filters disposed on the pixel areas and respective portions of the non-pixel area; and
a dummy color filter disposed on the red, green, and blue color filters in the non-pixel area.

18. The display apparatus of claim 17, wherein:
the dummy color filter is disposed in an area in which a transistor is formed in the non-pixel area; and
the light-shielding column spacer comprises a protrusion part configured to support the second base substrate in the area in which the dummy color filter is formed.

19. The display apparatus of claim 1, further comprising:
an organic insulation layer configured to cover the color filter layer,
wherein the pixel electrodes and the trap electrodes are disposed on the organic insulation layer.

20. The display apparatus of claim 1, wherein, in a plan view, each of the trap electrodes has a quadrilateral shape.

21. The display apparatus of claim 1, wherein, in a plan view, each of the trap electrodes has an "L" shape.

22. A display apparatus comprising:
a first base substrate comprising a display area and a non-display area;
a second base substrate configured to face the first base substrate;
a liquid crystal layer disposed between the first base substrate and the second base substrate;
a color filter layer disposed on the first base substrate in the display area and the non-display area;
pixel electrodes disposed on the color filter layer in the display area;
a low reflection column spacer disposed on the first base substrate in the non-display area, the low reflection column spacer comprising a low reflection material;
a common electrode disposed on the second base substrate and configured to face the pixel electrodes, the liquid crystal layer being disposed between the common electrode and the pixel electrodes; and
trap electrodes disposed between the common electrode and the color filter layer in the non-display area and facing the common electrode in a direction perpendicular to the first base substrate.

23. The display apparatus of claim 22, wherein:
the display area comprises pixel areas and a non-pixel area outside the pixel areas; and
wherein the color filter layer comprises:
red, green, and blue color filters disposed on the pixel areas and respective portions of the non-pixel area; and
a first dummy color filter disposed on the red, green, and blue color filters in the non-pixel area.

24. The display apparatus of claim 23, wherein the low reflection column spacer is disposed on the first dummy color filter in the non-pixel area and supports the second base substrate.

25. The display apparatus of claim 23, wherein the color filter layer comprises:

a second dummy color filter disposed on the first base substrate in the non-display area; and a third dummy color filter disposed on the second dummy color filter in the non-display area.

26. The display apparatus of claim 25, wherein the trap electrodes are disposed on the third dummy color filter such that the third dummy color filter is stacked between the trap electrodes and the first base substrate.

27. The display apparatus of claim 26, further comprising:
an organic insulation layer configured to cover the color filter layer,
wherein the pixel electrodes and the trap electrodes are disposed on the organic insulation layer.

28. The display apparatus of claim 27, wherein the trap electrodes comprise an opening part configured to expose the organic insulation layer.

29. The display apparatus of claim 22, wherein:
the common electrode is configured to receive a common voltage; and
the trap electrodes are configured to receive a trap voltage having a lower potential than the common voltage.

30. The display apparatus of claim 29, further comprising:
a sealing member disposed between the first base substrate and the second base substrate, the sealing member bonding the first base substrate and the second base substrate and sealing the liquid crystal layer,
wherein the sealing member is disposed on the low reflection column spacer in the non-display area.

31. The display apparatus of claim 30, further comprising:
a first alignment layer disposed on the low reflection column spacer in the non-display area and spaced apart from the sealing member so as not to overlap the sealing member in a plan view; and
a second alignment layer disposed on the common electrode in the non-display area and spaced apart from the sealing member so as not to overlap the sealing member in the plan view.

* * * * *